(12) United States Patent
Piao et al.

(10) Patent No.: US 10,805,644 B2
(45) Date of Patent: Oct. 13, 2020

(54) DEVICE AND METHOD FOR ENTROPY ENCODING AND DECODING

(71) Applicant: SAMSUNG ELECTRONICS CO., LTD., Suwon-si (KR)

(72) Inventors: Yin-ji Piao, Yongin-si (KR); Ki-ho Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 140 days.

(21) Appl. No.: 15/743,498

(22) PCT Filed: Jul. 25, 2016

(86) PCT No.: PCT/KR2016/008122
§ 371 (c)(1),
(2) Date: Jan. 10, 2018

(87) PCT Pub. No.: WO2017/043760
PCT Pub. Date: Mar. 16, 2017

(65) Prior Publication Data
US 2018/0205972 A1 Jul. 19, 2018

Related U.S. Application Data

(60) Provisional application No. 62/215,384, filed on Sep. 8, 2015.

(51) Int. Cl.
*H04N 19/91* (2014.01)
*H04N 19/119* (2014.01)
(Continued)

(52) U.S. Cl.
CPC .......... *H04N 19/91* (2014.11); *H04N 19/105* (2014.11); *H04N 19/119* (2014.11); *H04N 19/13* (2014.11);
(Continued)

(58) Field of Classification Search
CPC .... H04N 19/105; H04N 19/119; H04N 19/13; H04N 19/157; H04N 19/18; H04N 19/44; H04N 19/70; H04N 19/865; H04N 19/91
See application file for complete search history.

(56) References Cited

U.S. PATENT DOCUMENTS 9,014,260 B2  4/2015  Alshin et al.
9,253,481 B2  2/2016  Seregin et al.
(Continued)

FOREIGN PATENT DOCUMENTS

CN  103098469 A  5/2013
CN  103460701 A  12/2013
(Continued)

OTHER PUBLICATIONS

Communication dated Sep. 7, 2018 issued by the European Patent Office in counterpart European Application No. 16844580.7.
(Continued)

*Primary Examiner* — Sath V Perungavoor
*Assistant Examiner* — Tyler B Edwards
(74) *Attorney, Agent, or Firm* — Sughrue Mion, PLLC

(57) ABSTRACT

An entropy encoding device and method, and an entropy decoding device and method are disclosed. The entropy encoding method comprises the steps of: dividing a transform unit into a plurality of zones, and dividing each of the plurality of zones into sub zones; setting, as the first value, the value of the last zone flag, in which a sub zone including a valid transform coefficient among the plurality of zones is included, and setting, as the second value, the value of a zone flag of the remaining zones; setting, as the first value, the value of a sub zone flag of the divided sub zones having the valid transform coefficient, and setting, as the second value, a value of a sub zone flag of the divided sub zones which do not include the valid transform coefficient; deter-
(Continued)

mining a preset coefficient coding scheme among a plurality of coefficient coding schemes on the basis of the zone flag and the sub zone flag; encoding a coefficient included in a sub zone on the basis of the determined coefficient coding scheme; and transmitting data on the zone flag, the sub zone flag, and the encoded coefficient.

15 Claims, 36 Drawing Sheets

(51) Int. Cl.
H04N 19/44 (2014.01)
H04N 19/105 (2014.01)
H04N 19/157 (2014.01)
H04N 19/18 (2014.01)
H04N 19/13 (2014.01)
H04N 19/70 (2014.01)
H04N 19/86 (2014.01)

(52) U.S. Cl.
CPC ............ *H04N 19/157* (2014.11); *H04N 19/18* (2014.11); *H04N 19/44* (2014.11); *H04N 19/70* (2014.11); *H04N 19/865* (2014.11)

(56) References Cited

U.S. PATENT DOCUMENTS

| | | | |
|---|---|---|---|
| 9,407,936 | B2 | 8/2016 | Kim |
| 9,414,063 | B2 | 8/2016 | Lee et al. |
| 9,426,496 | B2 | 8/2016 | Kim |
| 9,462,275 | B2 | 10/2016 | Guo et al. |
| 9,467,701 | B2 | 10/2016 | Guo et al. |
| 9,516,350 | B2 | 12/2016 | Kim |
| 9,525,891 | B2 | 12/2016 | Kim |
| 9,565,435 | B2 | 2/2017 | Fang et al. |
| 9,591,333 | B2 | 3/2017 | Kim |
| 9,743,112 | B2 | 8/2017 | Lee et al. |
| 10,021,420 | B2 | 7/2018 | Lee et al. |
| 10,021,421 | B2 | 7/2018 | Lee et al. |
| 2011/0206135 | A1* | 8/2011 | Drugeon ............... H04N 19/129 375/240.24 |
| 2012/0320990 | A1 | 12/2012 | Chen et al. |
| 2013/0051459 | A1* | 2/2013 | Kirchhoffer ........... H04N 19/46 375/240.07 |
| 2013/0114731 | A1 | 5/2013 | Lee et al. |
| 2013/0188728 | A1 | 7/2013 | Auyeung |
| 2013/0202026 | A1 | 8/2013 | Fang et al. |
| 2013/0266074 | A1* | 10/2013 | Guo ...................... H04N 19/159 375/240.24 |
| 2013/0272414 | A1 | 10/2013 | Sole Rojals et al. |
| 2015/0117546 | A1* | 4/2015 | Kim ....................... H04N 19/60 375/240.18 |
| 2015/0139297 | A1 | 5/2015 | Kim |
| 2015/0189291 | A1 | 7/2015 | Kim |
| 2015/0195583 | A1 | 7/2015 | Kim |
| 2015/0195584 | A1 | 7/2015 | Kim |
| 2016/0330447 | A1 | 11/2016 | Lee et al. |
| 2016/0330482 | A1 | 11/2016 | Lee et al. |
| 2016/0330483 | A1 | 11/2016 | Lee et al. |
| 2018/0115781 | A1 | 4/2018 | Auyeung |
| 2018/0115782 | A1 | 4/2018 | Auyeung |

FOREIGN PATENT DOCUMENTS

| | | |
|---|---|---|
| CN | 104471934 A | 3/2015 |
| CN | 104995919 A | 10/2015 |
| EP | 2 154 894 A1 | 2/2010 |
| EP | 2 357 826 A2 | 8/2011 |
| EP | 2 712 201 A2 | 3/2014 |
| KR | 10-2014-0120909 A | 10/2014 |
| KR | 10-2014-0122698 A | 10/2014 |
| KR | 10-2014-0123978 A | 10/2014 |
| KR | 10-2015-0003778 A | 1/2015 |
| WO | 2013/116849 A1 | 8/2013 |

OTHER PUBLICATIONS

"High efficiency video coding", Series H: Audiovisual and Multimedia Systems Infrastructure of audiovisual services—Coding of moving video, International Telecommunication Union, ITU-T Telecommunication Standardization Sector of ITU, H.265, Apr. 2013, ((317 pages total).

Joel Sole et al., "Transform Coefficient Coding in HEVC", IEEE Transactions on Circuits and Systems for Video Technology, vol. 22, No. 12, Dec. 2012, pp. 1765-1777, (13 pages total).

Communication dated Nov. 4, 2016 by the International Searching Authority in counterpart International Patent Application No. PCT/KR2016/008122 (PCT/ISA/210).

Communication dated Nov. 4, 2016 by the International Searching Authority in counterpart International Patent Application No. PCT/KR2016/008122 (PCT/ISA/237).

Communication dated Feb. 25, 2020, issued by the State Intellectual Property Office of P.R. China in counterpart Chinese Application No. 201680051815.X.

* cited by examiner

FIG. 8
PARTITION TYPE (800)
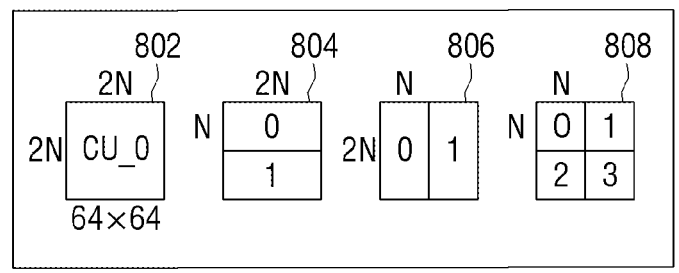
PREDICTION MODE (810)
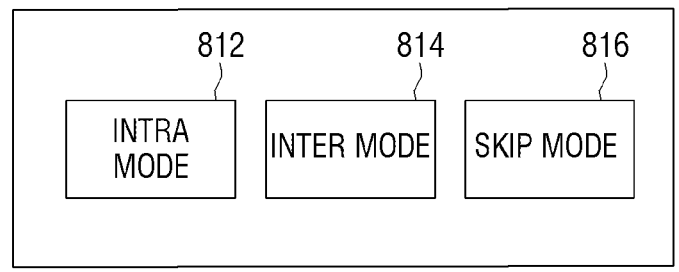
TRANSFORM UNIT SIZE (820)
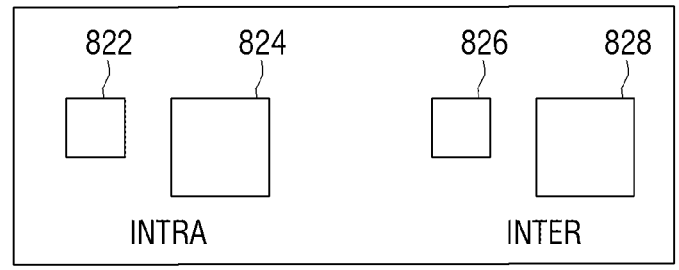

CODING UNIT (1010)

PREDICTION UNIT (1060)

FIG. 16

Subset (1600)

| 23 | 0 | 3 | 1 |
|----|---|---|---|
| 1  | 2 | 0 | 0 |
| 1  | 0 | 1 | 0 |
| 2  | 0 | 0 | 0 |

FIG. 17

Subset (1700)

| 1 | 0 | 1 | 1 |
|---|---|---|---|
| 1 | 1 | 0 | 0 |
| 1 | 0 | 1 | 0 |
| 1 | 0 | 0 | 0 |

FIG. 18

GTR1 Flag (1800)

| 1 |   | 1 | 0 |
|---|---|---|---|
| 0 | 1 |   |   |
| 0 |   | 0 |   |
| 1 |   |   |   |

FIG. 19

GTR2 Flag (1900)

| 1 |   | 1 |   |
|---|---|---|---|
|   | 0 |   |   |
|   |   |   |   |
| 0 |   |   |   |

FIG. 20

PROCESSING ORDER (SCANNING ORDER) ←

| Coeffcient | 23 | 1 | 0 | 1 | 2 | 3 | 2 | 0 | 0 | 1 | 0 | 1 |
|---|---|---|---|---|---|---|---|---|---|---|---|---|
| SIGMAP | 1 | 1 | 1 | 1 | 1 | 1 | 1 | 0 | 0 | 1 | 0 | 1 |
| GTR1 | 1 | 0 |   | 0 | 1 | 1 | 1 |   |   | 0 |   | 0 |
| GTR2 | 1 |   |   |   | 0 | 1 | 0 |   |   |   |   |   |
| Level-3 | 20 |   |   |   | 0 |   |   |   |   |   |   |   |

FIG. 21A

|  | 4 | 4 | N-8 |
|---|---|---|---|
| 4 | z0<br>0 | z1<br>1 | 4<br>z2 |
| 4 | 2 | 3 | 6 |
| N-8 | 5 | 7 | 8 |

FIG. 21B

|  | 4 | 8 | | N-12 |
|---|---|---|---|---|
| 4 | z0<br>0 | 1 | z1<br>3 | z2<br>6 |
| 8 | 2 | 4 | 7 | 10 |
|  | 5 | 8 | 11 | 13 |
| N-12 | 9 | 12 | 14 | 15 |

FIG. 21C

|  | 4 | 4 | 4 | N-12 |
|---|---|---|---|---|
| 4 | z0<br>0 | z1<br>1 | 3<br>z2 | 6<br>z3 |
| 4 | 2 | 4 | 7 | |
| 4 | 5 | | 8 | 10 |
| N-12 | 9 | | | |

FIG. 22A

| z0 | z1 | z2 |
|----|----|----|
| 0  | 1  | 4  |
| 2  | 3  | 6  |
| 5  | 7  | 8  |

FIG. 22B

| z0 | z1 | z2 |
|----|----|----|
| 0  | 1  | 4  |
| 2  | 3  | 6  |
| 5  | 7  | 8  |

FIG. 33

| Zflag | | | | | | Trskip | | IZflag | | | |
|---|---|---|---|---|---|---|---|---|---|---|---|
| Inverse=0 | | Inverse=1 | | 0 | 1 | Inverse=0 | | Inverse=1 | | | |
| 16×16 | 8×8 | 16×16 | 32×32 | 8×8 | 32×32 | 4×4 | 4×4 | 16×16 | 32×32 | 8×8 | 16×16 | 32×32 | 8×8 |
| sz0 sz1 sz2 sz3 | sz0 sz1 sz2 sz3 | sz0 sz1 sz2 sz3 | | | | | | | | | |
| 12 | 24 | 36 | | | 72 | 75 | 78 | | 114 | | 150 |

FIG. 34

| | Inverse=0 | | | | Inverse=1 | | |
|---|---|---|---|---|---|---|---|
| 16×16 | 32×32 | 8×8 | 16×16 | | 32×32 | 8×8 | |
| sz0 sz1 sz2 sz3 sz4 sz5 sz6 sz7 sz8 | sz0 sz1 sz2 sz3 sz4 sz5 sz6 sz7 sz8 | sz0 sz1 sz2 sz3 | sz0 sz1 sz2 sz3 sz4 sz5 sz6 sz7 sz8 | | sz1 sz2 sz3 sz4 sz5 sz6 sz7 sz8 | sz0 sz1 sz2 sz3 | |
| 12 | 40 | 80 | 96 | 108 | | 176 | |

FIG. 35

| | CCsX | CCsZ | | | CCsX & !fz | | | | | CCsY | | | | !fz | | |
|---|---|---|---|---|---|---|---|---|---|---|---|---|---|---|---|---|
| 16×16 | 32×32 | 8×8 | | 16×16 | 32×32 | 8×8 | | 16×16 | 32×32 | 8×8 | | 16×16 | 32×32 | 8×8 | 4×4 |
| szIdx*4 | szIdx*4 | szIdx*4 | | szIdx*4 | szIdx*4 | szIdx*4 | | szIdx*4 | szIdx*4 | szIdx*4 | | szIdx*4 | szIdx*4 | szIdx*4 | |
| 36 | 40 | 880 | 120 | | | | 240 | | | | 360 | | | 480 | 489 |

InterCU && !CCsZ

| | CCsX | CCsZ | | | CCsX & !fz | | | | | CCsY | | | | !fz | | |
|---|---|---|---|---|---|---|---|---|---|---|---|---|---|---|---|---|
| 16×16 | 32×32 | 8×8 | | 16×16 | 32×32 | 8×8 | | 16×16 | 32×32 | 8×8 | | 16×16 | 32×32 | 8×8 | 4×4 |
| szIdx*4 | szIdx*4 | szIdx*4 | | szIdx*4 | szIdx*4 | szIdx*4 | | szIdx*4 | szIdx*4 | szIdx*4 | | szIdx*4 | szIdx*4 | szIdx*4 | |
| 500 | | | | | | | | | | | | | | | 989 |

FIG. 36

| CCsA | | CCsB | | GT1 | GT2 | CCsC |
|---|---|---|---|---|---|---|
| | | | | \multicolumn{2}{c}{Trskip} | |
| | | | | 0 | 0 | |
| zflag | !zflag | zflag | !zflag | 4×4 | 4×4 | |
| 16 | 32 | 48 | 64 | 68 | 0 | 16 |

DEVICE AND METHOD FOR ENTROPY ENCODING AND DECODING

TECHNICAL FIELD

The present invention relates to a device and a method for entropy encoding and decoding, and more particularly to a device and a method for entropy encoding and decoding, which can perform encoding and decoding through selection of context models corresponding to various conditions.

BACKGROUND ART

With the development of electronic technology, a display device having high picture quality has been developed. As the display device having high picture quality is developed, the necessity of technology to transmit and receive an image of high picture quality has increased. In general, in order to transmit and receive an image, an image compression scheme is used. The image compression scheme may include processes of dividing an image into blocks having a predetermined size and acquiring residual data using direction prediction according to the characteristic of the image. The residual data may be compressed through transform, quantization, and entropy coding processes. In the entropy coding process, the amount of residual data to be transmitted may be reduced through application of an optimum context model. With the development of communication technology, a larger amount of data can be transmitted for the same time as compared with the past, but a required amount of image data has been much more increased. Accordingly, there is a need for efficient entropy encoding and decoding processes.

DISCLOSURE

Technical Problem

An object of the present invention is to provide a device and a method for entropy encoding and decoding, which can divide a coding unit into a plurality of blocks and perform efficient coding based on the characteristic of the blocks and the relationship between neighboring blocks.

Technical Solution

According to an embodiment in order to achieve the above object, an entropy encoding method includes the steps of dividing a transform unit into a plurality of zones and dividing each of the plurality of zones into sub zones; setting a zone flag value with respect to the last zone which includes the sub zone including a coefficient that is not 0 among the plurality of zones; setting a sub zone flag value with respect to each of the divided sub zones if the divided sub zone includes the coefficient that is not 0; determining a preset coefficient coding scheme based on the zone flag and the sub zone flag; encoding a coefficient included in a specific sub zone of the transform unit based on the determined coefficient coding scheme; and transmitting data on the zone flag, the sub zone flag, and the encoded coefficient.

According to an embodiment in order to achieve the above object, an entropy encoding device includes an entropy encoder configured to divide a transform unit into a plurality of zones and dividing each of the plurality of zones into sub zones, to set a zone flag value with respect to the last zone which includes the sub zone including a coefficient that is not 0 among the plurality of zones, to set a sub zone flag value with respect to each of the divided sub zones if the divided sub zone includes the coefficient that is not 0, to determine a preset coefficient coding scheme based on the zone flag and the sub zone flag, and to encode a coefficient included in a specific sub zone of the transform unit based on the determined coefficient coding scheme; and a communicator configured to transmit data on the zone flag, the sub zone flag, and the encoded coefficient.

According to an embodiment in order to achieve the above object, an entropy decoding method includes the steps of receiving data on a zone flag, a sub zone flag, and an encoded coefficient; decoding the received zone flag and the received sub zone flag; determining a preset coefficient coding scheme based on the decoded zone flag and the decoded sub zone flag; and decoding data on the received encoded coefficient based on the determined coefficient coding scheme, wherein the zone flag indicates the last zone which includes a sub zone including a coefficient that is not 0 among a plurality of zones into which a transform unit is divided, and the sub zone flag indicates the sub zone which includes a coefficient that is not 0 among sub zones into which each of the plurality of zones is divided.

According to an embodiment in order to achieve the above object, an entropy decoding device includes a communicator configured to receive data on a zone flag, a sub zone flag, and an encoded coefficient; and an entropy decoder configured to decode the received zone flag and the received sub zone flag, to determine a preset coefficient coding scheme based on the decoded zone flag and the decoded sub zone flag, and to decode data on the received encoded coefficient based on the determined coefficient coding scheme, wherein the zone flag indicates the last zone which includes a sub zone including a coefficient that is not 0 among a plurality of zones into which a transform unit is divided, and the sub zone flag indicates the sub zone which includes a coefficient that is not 0 among sub zones into which each of the plurality of zones is divided.

Advantageous Effects

According to various embodiments as described above, the device and the method for entropy encoding and decoding can perform efficient encoding and decoding, and can transmit and receive the same information with a smaller number of bit streams.

DESCRIPTION OF DRAWINGS

FIG. 8 is a diagram explaining encoding information for each depth according to an embodiment of the present invention;

FIG. 16 is a diagram explaining an example of a sub zone included in a transform unit;

FIG. 17 is a diagram explaining a significance map corresponding to a sub zone;

FIG. 18 is a diagram explaining a first threshold value flag corresponding to a sub zone;

FIG. 19 is a diagram explaining a second threshold value flag corresponding to a sub zone;

FIG. 20 is a diagram explaining transform coefficients included in one sub zone and entropy-encoded and decoded transform coefficient information;

FIGS. 21A to 21C are diagrams explaining a zone including a plurality of sub zones according to an embodiment of the present invention;

FIGS. 22A and 22B are diagrams explaining an adaptive scanning scheme according to an embodiment of the present invention;

FIG. 33 is a diagram explaining an embodiment in which a context model for coding the last coefficient position is determined;

FIG. 34 is a diagram explaining an embodiment in which a context model for coding a scanning zone is determined;

FIG. 35 is a diagram explaining an embodiment in which a context model for coding a significant flag is determined; and FIG. 36 is a diagram explaining an embodiment in which a context model for level coding is determined.

BEST MODE FOR INVENTION

Hereinafter, various embodiments of the present invention will be described in detail with reference to the accompanying drawings. An image described in the description may include not only a still image but also a moving image.

Figure 1:
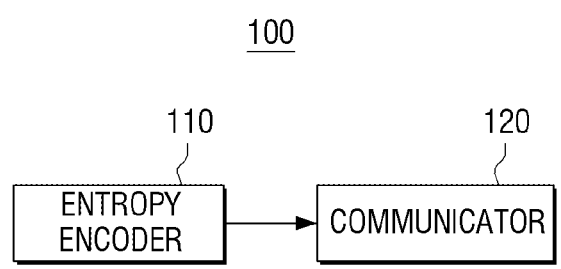
FIG. 1 is a block diagram of an image encoding device according to an embodiment of the present invention.

FIG. 1 is a block diagram of an image encoding device according to an embodiment of the present invention.

Referring to FIG. 1, an image encoding device 100 includes an entropy encoder 110 and a communicator 120.

The image encoding device 100 performs encoding through division of an image in the unit of data having a predetermined size. The divided data unit may be variously provided, and may be in a square data unit. For example, the image encoding device 100 may perform processes of prediction encoding, frequency conversion, quantization, and entropy encoding in order to encode image data. The prediction encoding process means a process of generating a prediction signal that is similar to the original signal. In the prediction encoding process, an intra-prediction or inter-prediction scheme may be used. The frequency conversion process means transforming of a signal in a spatial domain into a signal in a frequency domain. The quantization process means a process of approximating a frequency conversion coefficient into several representative values. The quantization process serves to reduce data to be transmitted although it accompanies a loss of information. Further, the entropy encoding process means a process of efficiently reducing the amount of data to be transmitted without a loss of information and encoding necessary information for decoding. That is, the entropy encoder 110 may output image data in the unit of encoded data and information on an encoding mode in the form of bit streams.

On the other hand, the image encoding device 100 processes data in a predetermined data unit in the respective processes, and the size or type of the data unit for encoding the image data can be variously selected. The detailed process thereof will be described later.

In an embodiment, the entropy encoder 110 divides a transform unit into a plurality of zones, and divides each of the plurality of zones into sub zones. Each of the sub zones may be a coefficient coding unit (CCU).

In order to encode the image data, the image encoding device 100 may hierarchically divide and encode the image data. The image encoding device 100 may divide a coding tree unit (CTU) that is a basic processing unit for image coding, a coding unit (CU) for dividing the coding tree unit in order to encode the image data, a predictor (PU) for dividing the coding unit in order to perform prediction encoding, or a coding unit that is the basis of the frequency transform into a divided transform unit (YU). For example, if the coding unit is 2N×2N, the transform unit may be 2N×2N, N×N, or N/2×N/2. The entropy encoder 110 may divide the transform unit into a plurality of zones, and may divide each of the plurality of zones into a plurality of sub zones. Each zone may include a plurality of sub zones. Further, the numbers of sub zones included in one zone may differ from each other. For example, if 16 sub zones exist, the entropy encoder 110 may divide the transform unit into three zones. Further, the first zone may include one sub zone, the second zone may include three sub zones, and the third zone may include 12 sub zones. On the other hand, the entropy encoder 110 may divide the transform unit into a plurality of sub zones, and may bind parts of the divided sub zones into one zone.

On the other hand, the image encoding device 100 may further include a hierarchical encoding unit (not illustrated). In this case, the hierarchical encoding unit may divide the transform unit into the plurality of zones, and may divide each of the plurality of zones into sub zones.

The entropy decoder 110 sets a zone flag value with respect to the last zone which includes the sub zone including a coefficient that is not 0 among the plurality of zones, and sets a sub zone flag value with respect to each of the divided sub zones if the divided sub zone includes the coefficient that is not 0. That is, initial values of the zone flag or the sub zone flag may be 0, and if the condition is satisfied, the values of the zone flag and the sub zone flag may be set to 1.

If the image encoding device 100 encodes the image data by performing the prediction encoding, frequency conversion, and quantization processes, the respective sub zones of the image data may include coefficients corresponding to respective pixels. All coefficients included in the sub zone may be 0, some coefficients included in the sub zone may be 0, and other coefficients may not be 0. The entropy encoder 110 may determine the zone in which the sub zone including the coefficient that is not 0 is included. Further, the entropy encoder 110 may set sub zone flag values with respect to the sub zones including the coefficients that are not 0. For example, it is assumed that the first zone includes the first sub zone, the second zone includes the second to fourth sub zones, and the third zone includes the fifth to $12^{th}$ sub zones. Further, it is assumed that the first, second, and fourth sub zones include the coefficients that are not 0, and the coefficients of the remaining sub zones are all 0. The zones which include the sub zones including the coefficients that are not 0 are the first zone and the second zone. Accordingly, the second zone becomes the last zone including the coefficients that are not 0. Accordingly, the zone flag of the second zone may be set to 1. The zone flag values of the first and third zones may be 0 that is the initial value. Further, the sub zone flags of the first, second, and fourth sub zones may be set to 1. The sub zone flags of the remaining sub zones may be 0 that is the initial value.

Further, the entropy encoder 110 determines a preset coefficient coding scheme based on the zone flag and the sub zone flag. Further, the entropy encoder 110 encodes the coefficients included in the sub zone based on the determined coefficient coding scheme. The detailed process thereof will be described later.

On the other hand, with reference to FIG. 1, an embodiment has been described, in which the entropy encoder 110 sets the zone flag and sub zone flag values. However, the entropy encoder 110 may indicate the zones and the sub zones including the coefficients that are not 0 in an index scheme. The index scheme means a scheme for directly indicating the zone or the sub zone including the coefficient that is not 0. That is, in the embodiment as described above, if a flag scheme is used, the entropy encoder 110 may perform encoding by setting the zone flag values to 0, 1, and 0 and setting the sub zone flag values to 1, 1, 0, 1, 0, 0, and so on. Further, an image decoding device may receive encoded flag information, and may determine the zone or the sub zone including the coefficients that are not 0 by confirming one by one the zone flags and the sub zone flags. In contrast, if the index scheme is used, the entropy encoder 110 may encode information indicating the second zone, the first sub zone, the second sub zone, and the fourth sub zone. Information indicating the respective zones or sub zones is the zone index or the sub zone index. The detailed schemes for transmitting information of the zone or the sub zone and transmission data may differ in accordance with the flag scheme or the index scheme. However, information of the zone or the sub zone including the coefficients that are not 0 is the same information, and the process of determining the coefficient coding scheme using the information of the zone or the sub zone and encoding the coefficients included in the sub zone based on the determined coefficient coding scheme is the same.

The communicator 120 transmits data on the zone flag, the sub zone flag, and the encoded coefficient to the image decoding device. The image decoding device receives and decodes the transmitted image data.

Figure 2:
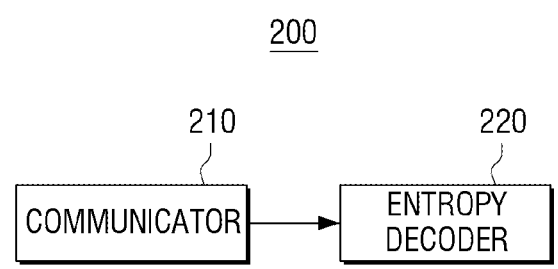
FIG. 2 is a block diagram of an image decoding device according to an embodiment of the present invention.

FIG. 2 is a block diagram of an image decoding device according to an embodiment of the present invention.

Referring to FIG. 2, an image decoding device 200 includes a communicator 210 and an entropy decoder 220. The communicator 210 receives data on a zone flag, a sub zone flag, and an encoded coefficient from the image encoding device.

The image decoding unit 220 extracts information on image data for each coding unit. The information on the image data may include the zone flag and sub zone flag information. The entropy decoder 220 may decode the received zone flag and the received sub zone flag, and as described above, the zone flag may indicate the last zone which includes a sub zone including a coefficient that is not 0 among a plurality of zones into which a transform unit is divided. Further, the sub zone flag may indicate the sub zone which includes a coefficient that is not 0 among sub zones into which each of the plurality of zones is divided.

In an embodiment as described above, the image decoding device 200 may decode the zone flag values to 0, 1, and 0 and may decode the sub zone flag values to 1, 1, 0, 1, 0, 0, and so on. The entropy decoder 220 may confirm the zone flag of the first zone, and may determine that the first zone is not the last zone including the coefficient that is not 0. Further, the entropy decoder 220 may confirm the sub zone flags of the first and second sub zones, and may determine that the first and second sub zones include the coefficients that are not 0. Further, the entropy decoder 220 may confirm the sub zone flag of the third sub zone, and may determine that the third sub zone does not include the coefficient that is not 0. Further, the entropy decoder 220 may confirm the sub zone flag of the fourth sub zone, and may determine that the fourth sub zone includes the coefficient that is not 0. In the same manner, the entropy decoder 220 may confirm all sub zones and may determine whether the coefficients that are not 0 are included therein.

The entropy decoder 220 confirms the zone flag and the sub zone flag, and determines the preset coefficient coding scheme based on the zone flag and the decoded sub zone flag. The image decoding device 200 and the image encoding device may share the same coefficient coding scheme. Accordingly, if a predetermined condition is satisfied, the image decoding device 200 can decode the data on the encoded coefficient using the same coefficient coding scheme as the coefficient coding scheme used by the image encoding device.

As described above, the image encoding device and the image decoding device 200 may transmit and receive the information on the zone and the sub zone in the index scheme. That is, the entropy decoder 220 may determine the zone index and the sub zone index from the information on the extracted image data. The entropy decoder 220 may determine the last zone including the coefficient that is not 0 and the sub zone including the coefficient that is not 0 based on the determined index.

On the other hand, the image decoding device 200 may include a hierarchical decoding unit (not illustrated), and the hierarchical decoding unit may restore the current picture through decoding of the image data in the maximum coding unit based on information on the encoded image. In an embodiment, information on the encoded image may include information on a partition type, a prediction mode, and a transform unit read for each coding unit. The hierarchical decoding unit may decode the encoded image data based on the information on the encoded image among coding units according to a tree structure included in the maximum coding unit.

Hereinafter, a unit according to a tree structure and a unit determination scheme according to an embodiment of the present invention will be described.

Figure 3:
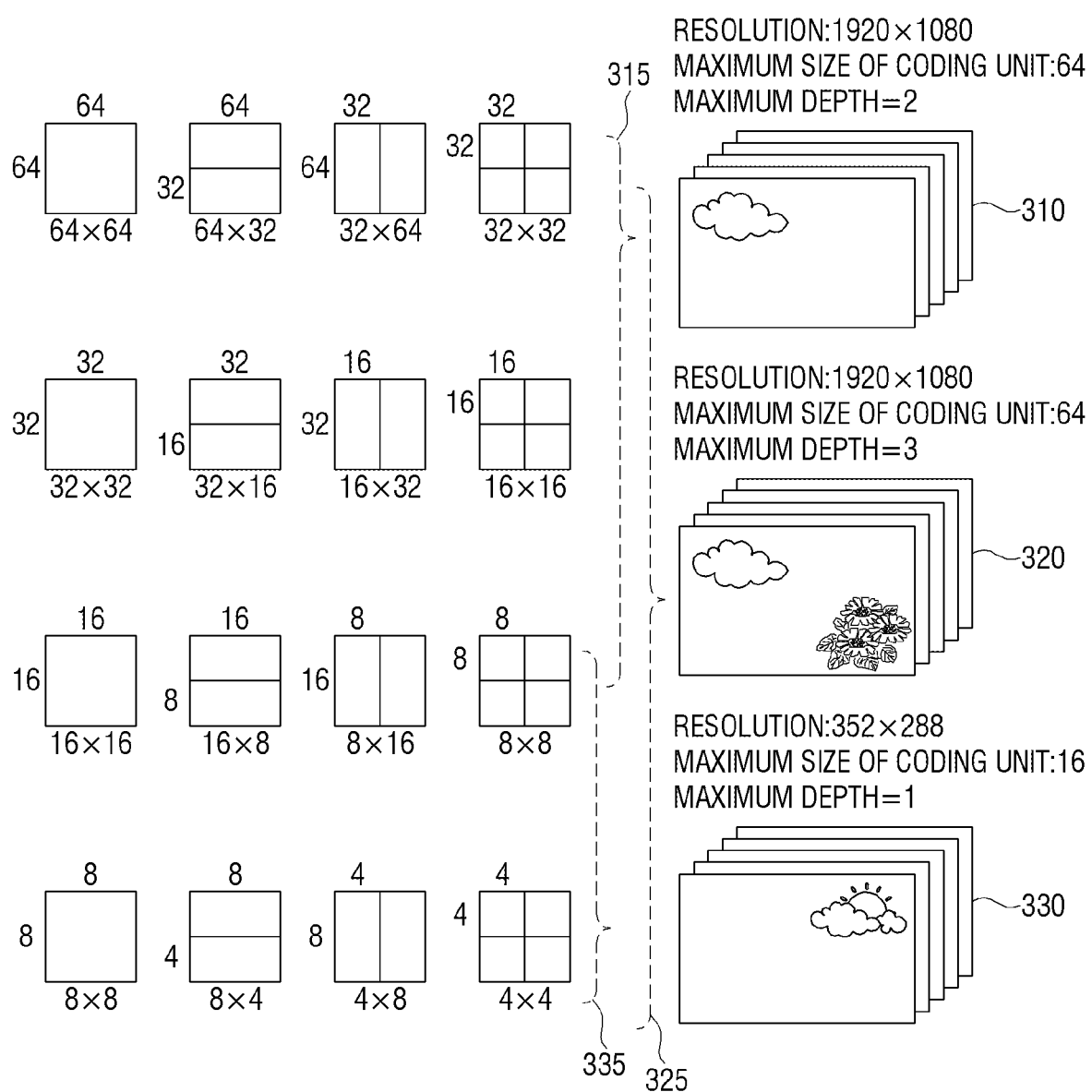
FIG. 3 is a diagram explaining the concept of a coding unit according to an embodiment of the present invention.

FIG. 3 is a diagram explaining the concept of a coding unit according to an embodiment of the present invention.

For example, the size of a coding unit (CU) may be expressed as width×height, and the coding unit may include sizes of 64×64, 32×32, 16×16, and 8×8. The coding unit having the size of 64×64 may be divided into partitions having the sizes of 64×64, 64×32, 32×64, and 32×32, and the coding unit having the size of 32×32 may be divided into partitions having the sizes of 32×32, 32×16, 16×32, and 16×16. Further, the coding unit having the size of 8×8 may be divided into partitions having the sizes of 8×8, 8×4, 4×8, and 4×4.

For example, in the case of first image data 310, it may be set that the resolution is 1920×1080, the maximum size of the coding unit is 64, and the maximum depth is 2. The depth means the number of times the coding unit is divided from the maximum coding unit, and as the depth becomes larger, the coding unit for each depth may be divided from the maximum coding unit to the minimum coding unit. In the case of second image data 320, it may be set that the resolution is 1920×1080, the maximum size of the coding unit is 64, and the maximum depth is 3. In the case of third image data 330, it may be set that the resolution is 352×288, the maximum size of the coding unit is 16, and the maximum depth is 1. The maximum depth as illustrated in FIG. 3 indicates the total number of times of division from the maximum coding unit to the minimum coding unit.

In the case of a high resolution or a large data amount, it is preferable that the maximum size of the coding size is relatively large in order to improve the coding efficiency and to accurately reflect the image characteristics. Accordingly, as compared with the third image data 330, the maximum coding size of the first and second image data 310 and 320 having high resolution may be selected as 64. Since the maximum depth of the first image data 310 is 2, the coding unit 315 of the first image data 310 may be divided twice from the maximum coding unit in which the long-axis size is 64, and since the depth becomes larger for two layers, the coding unit 315 may include even the coding units having the long-axis sizes of 32 and 16. In contrast, since the maximum depth of the third image data 330 is 1, the coding unit 335 of the third image data 330 may be divided once from the coding units in which the long-axis size is 16, and since the depth becomes larger for one layer, the coding unit 315 may include even the coding units having the long-axis size of 8. Since the coding unit 325 of the second image data 320 may be divided three times from the maximum coding unit in which the long-axis size is 64, and since the depth becomes larger for three layers, the coding unit 315 may include even the coding units having the long-axis sizes of 32, 16, and 8.

Figure 4:
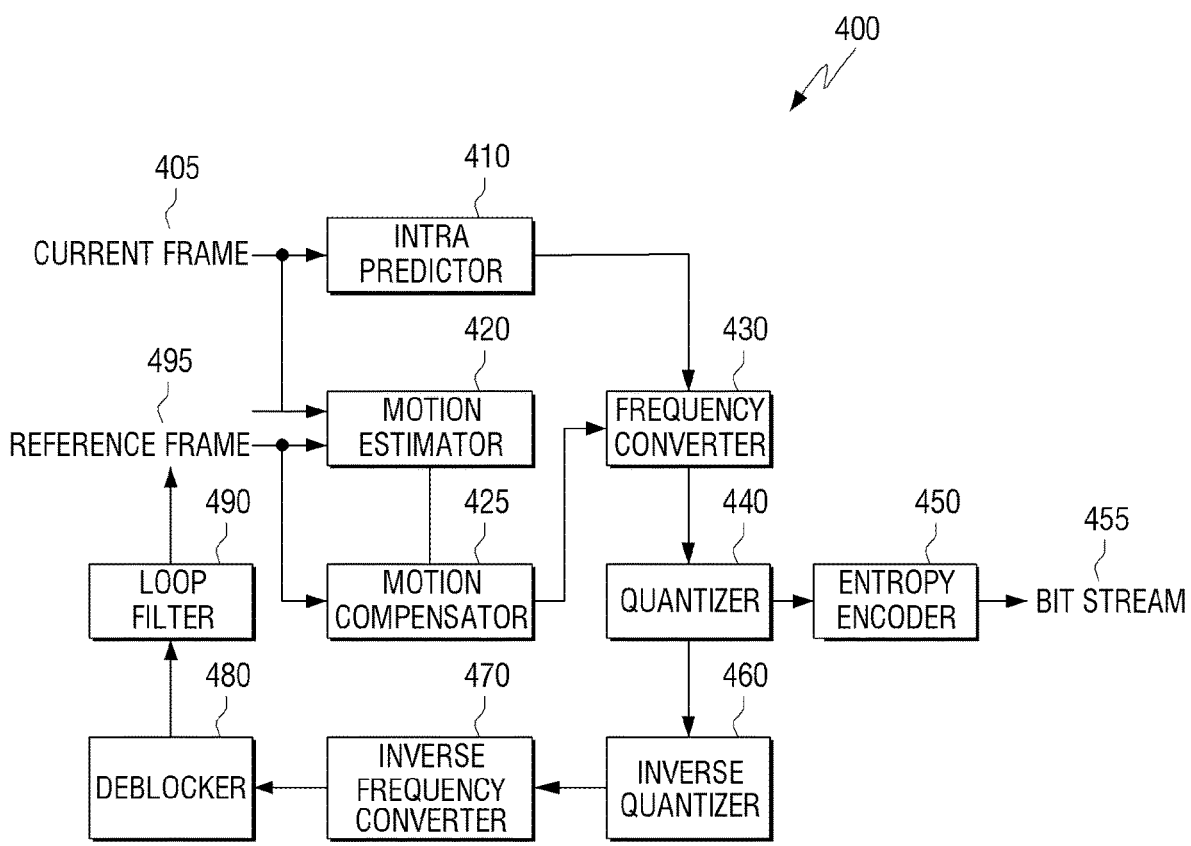
FIG. 4 is a detailed block diagram of an image encoding device according to an embodiment of the present invention.

FIG. 4 is a detailed block diagram of an image encoding device according to an embodiment of the present invention.

Referring to FIG. 4, an image encoding device 400 may include an intra predictor 410, a motion estimator 420, a motion compensator 425, a frequency converter 430, a quantizer 440, an entropy encoder 450, an inverse quantizer 460, an inverse frequency converter 470, a deblocker 480, and a loop filter 490.

The intra predictor 410 performs intra prediction with respect to the coding unit of an intra mode, and the motion estimator 420 and the motion compensator 425 may perform inter prediction and motion compensation using the current frame 405 and a reference frame 495 of an inter mode.

Data output from the intra predictor 410, the motion estimator 420, and the motion compensator 425 is output as quantized transform coefficients through the frequency converter 430 and the quantizer 440. The quantized transform coefficient is restored to data in a spatial domain through the inverse quantizer 460 and the inverse frequency converter 470, and the restored data in the spatial domain is post-processed through a deblocker 480 and the loop filter 490 to be output as the reference frame 495. The quantized transform coefficients may be output as a bit stream 455 through the entropy encoder 450.

In an embodiment, in the case of encoding syntax elements of the transform unit, for example, the first threshold value (GT1) flag and the second threshold value (GT2) flag, the entropy encoder 450 may acquire a context set index based on whether there exist color component information of the transform unit, the position of the current subset, and whether a significant transform coefficient having a value that is larger than the first threshold value exists in the previous subset, may acquire a context offset based on the length of the transform coefficient having the previous successive value of 1, and may determine a context index indicating a context model based on the acquired context set index and the context offset.

The intra predictor 410, the motion estimator 420, the motion compensator 425, the frequency converter 430, the quantizer 440, the entropy encoder 450, the inverse quantizer 460, the inverse frequency converter 470, the deblocker 480, and the loop filter 490, which are the constituent elements of the image encoding device 400, may all perform tasks based on the respective coding units according to the tree structure in consideration of the maximum coding unit and the maximum depth.

The intra predictor 410, the motion estimator 420, and the motion compensator 425 may determine partitions and prediction modes of the respective coding units among the coding units according to the tree structure in consideration of the maximum size and the maximum depth of the current maximum coding unit, and the frequency converter 430 may determine the size of the transform unit in the respective coding units among the coding units according to the tree structure.

Figure 5:
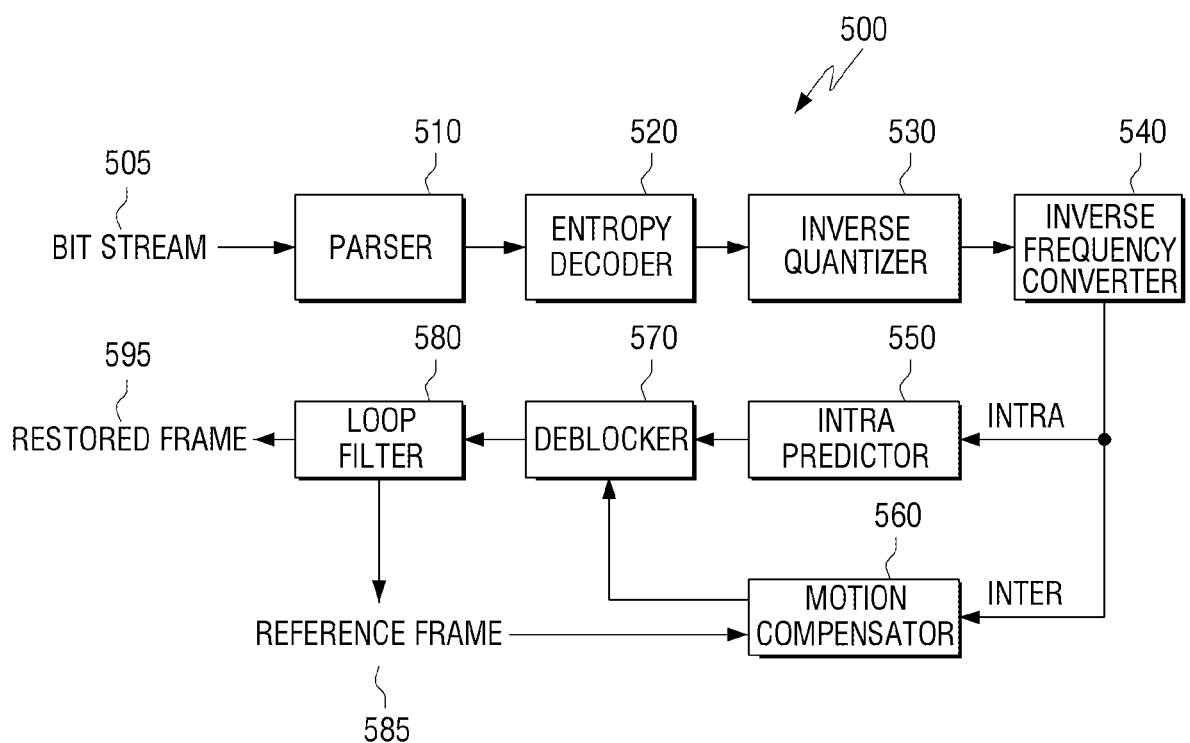
FIG. 5 is a detailed block diagram of an image decoding device according to an embodiment of the present invention.

FIG. 5 is a detailed block diagram of an image decoding device according to an embodiment of the present invention.

Referring to FIG. 5, an image decoding device 500 may include a parsing unit 510, an entropy decoder 520, an inverse quantizer 530, an inverse frequency converter 540, an intra predictor 550, a motion compensator 560, a deblocker 570, and a loop filter 580.

The parsing unit 510 may parse information on the encoded image data that is a target of encoding and the encoding required for the decoding. The encoded image data is output as inverse-quantized data through the entropy decoder 520 and the inverse quantizer 530, and the image data in the spatial domain may be restored through the inverse frequency converter 540. The intra predictor 550 may perform intra prediction based on the coding unit of the intra mode with respect to the image data in the spatial domain, and the motion compensator 560 may perform motion compensation with respect to the coding unit of the inter mode using the reference frame 585 together. The data in the spatial domain that has passed through the intra predictor 550 and the motion compensator 560 is post-processed through the deblocker 570 and the loop filter 580 to be output as a restored frame 595. Further, the data post-processed through the deblocker 570 and the loop filter 580 may be output as the reference frame 585.

The parsing unit 510, the entropy decoder 520, the inverse quantizer 530, the inverse frequency converter 540, the intra predictor 550, the motion compensator 560, the deblocker 570, and the loop filter 4580, which are the constituent elements of the image decoding device 500, may all perform tasks based on the coding units according to the tree structure in consideration of the maximum coding unit.

The intra predictor 550 and the motion compensator 560 may determine partitions and prediction modes of the respective coding units according to the tree structure, and the inverse frequency converter 540 may determine the size of the transform unit in the respective coding units. Further, in an embodiment, in the case of decoding syntax elements of the transform unit, for example, the first threshold value (GT1) flag and the second threshold value (GT2) flag, the entropy decoder 520 may acquire a context set index based on whether there exist color component information of the transform unit, the position of the current subset, and whether a significant transform coefficient having a value that is larger than the first threshold value exists in the previous subset, may acquire a context offset based on the length of the transform coefficient having the previous successive value of 1, and may determine an index indicating a context model based on the acquired context set index and the context offset.

Figure 6:
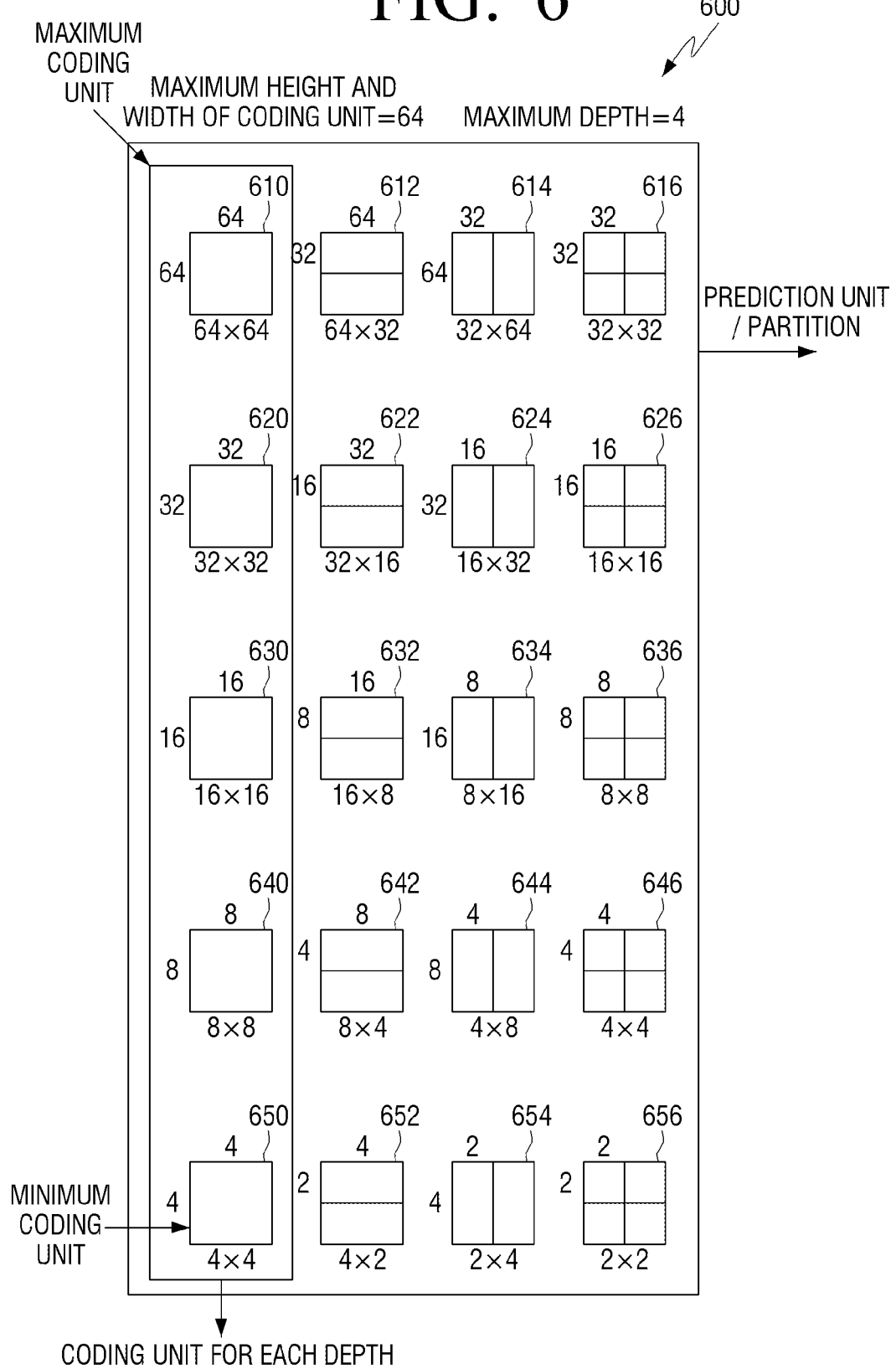
FIG. 6 is a diagram explaining coding units for each depth and partitions according to an embodiment of the present invention.

FIG. 6 is a diagram explaining coding units for each depth and partitions according to an embodiment of the present invention.

In an embodiment, the image encoding device 100 and the image decoding device 200 may use hierarchical coding units in consideration of the image characteristics. The maximum height and width and the maximum depth of the coding unit may be adaptively determined according to the image characteristics, and may be diversely set according to a user's requirement. In accordance with the maximum size of the preset coding unit, the size of the coding unit for each depth may be determined.

In an embodiment, a hierarchical structure 600 of the coding unit illustrates a case where the maximum height and width of the coding unit are 64 and the maximum depth is 4. In an embodiment, since the depth becomes larger along the vertical axis of the hierarchical structure 600 of the coding unit, the height and width of the coding unit for each depth may be divided from each other. Further, along the horizontal axis of the hierarchical structure 600 of the coding unit, predictors and partitions that become the basis of prediction encoding in the respective coding units for each depth are illustrated.

That is, the coding unit 610 is the maximum coding unit in the hierarchical structure 600 of the coding unit in which the depth is 0, the size of the coding unit, that is, height and width, is 64×64. The depth becomes larger along the vertical axis, and there exist a coding unit 620 of depth 1 having the size of 32×32, a coding unit 630 of depth 2 having the size of 16×16, a coding unit 640 of depth 3 having the size of 8×8, and a coding unit 650 of depth 4 having the size of 4×4. The coding unit 650 of depth 4 having the size of 4×4 is the minimum coding unit. Along the horizontal axis for each depth, the predictors and partitions of the coding unit are arranged. That is, if the coding unit 610 of depth 0 having the size of 64×64 is the predictor, the predictor may be divided into a partition 610 having the size of 64×64, a partition 612 having the size of 64×32, a partition 614 having the size of 32×64, and a partition 616 having the size of 32×32, which are included in the coding unit 610 having the size of 64×64.

In the same manner, the predictor of the coding unit 620 of depth 1 having the size of 32×32 may be divided into a partition 620 having the size of 32×32, a partition 622 having the size of 32×16, a partition 624 having the size of 16×32, and a partition 626 having the size of 16×16, which are included in the coding unit 620 having the size of 32×32. Further, the predictor of the coding unit 630 of depth 2 having the size of 16×16 may be divided into a partition 630 having the size of 16×16, a partition 632 having the size of 16×8, a partition 634 having the size of 8×16, and a partition 636 having the size of 8×8, which are included in the coding unit 630 having the size of 16×16. Similarly, the predictor of the coding unit 640 of depth 3 having the size of 8×8 may be divided into a partition 640 having the size of 8×8, a partition 642 having the size of 8×4, a partition 644 having the size of 4×8, and a partition 646 having the size of 4×4, which are included in the coding unit 640 having the size of 8×8. Last, the predictor of the coding unit 650 of depth 4 having the size of 4×4 may be divided into a partition 650 having the size of 4×4, a partition 652 having the size of 4×2, a partition 654 having the size of 2×4, and a partition 656 having the size of 2×2, which are included in the coding unit 650 having the size of 4×4. According to circumstances, the predictor of the coding unit 650 of depth 4 having the size of 4×4 may be the minimum coding unit of the smallest depth, and the corresponding predictor may be set to only the partition 650 having the size of 4×4.

In an embodiment, in order to determine the coding depth of the maximum coding unit 610, the image encoding device 100 should perform encoding for each coding unit of each depth included in the maximum coding unit 610. As the depth becomes larger, the number of coding units for each depth for including data having the same range and size also becomes larger. For example, with respect to data included in one coding unit of depth 1, four coding units of depth 2 are required. Accordingly, in order to compare the encoding results for the same data with each other for each depth, they should be respectively encoded using one coding unit of depth 1 and four coding units of depth 2. For encoding for each depth, encoding may be performed for predictors of the coding unit for each depth along the horizontal axis of the hierarchical structure 600 of the coding unit, and a representative coding error that is the smallest coding error at the corresponding depth may be selected. Further, as the depth becomes larger along the vertical axis of the hierarchical structure 600 of the coding unit, encoding may be performed for each depth, and the minimum coding error may be searched for through comparison of the representative coding errors with each other for each depth. The depth and partition for which the minimum coding error occurs among the maximum coding units 610 may be selected as the coding depth and the partition type of the maximum coding unit 610.

Figure 7:
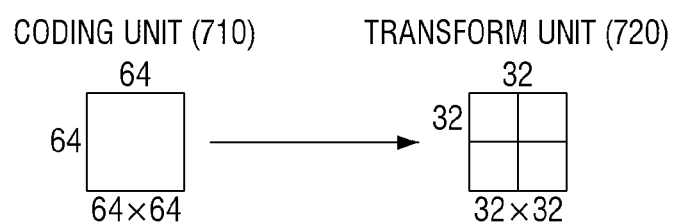
FIG. 7 is a diagram explaining the relationship between a coding unit and a transform unit according to an embodiment of the present invention.

FIG. 7 is a diagram explaining the relationship between a coding unit and a transform unit according to an embodiment of the present invention.

In an embodiment, the image encoding device 100 or the image decoding device 200 may encode or decode an image based on the maximum coding units. However, the image encoding device 100 or the image decoding device 200 may encode or decode the image in the coding unit having the size that is smaller than or equal to the size of the maximum coding unit. During the encoding process, the size of the transform unit for frequency transform may be selected based on the data unit that is not larger than the respective coding units. For example, in an embodiment, if the current coding unit 710 has a size of 64×64 in the image encoding device 100 or the image decoding device 200, frequency transform may be performed using the transform unit 720 having the size of 32×32. Further, data of the coding unit 710 having the size of 64×64 may be frequency-transformed into transform units having the sizes of 32×32, 16×16, 8×8, and 4×4, which are smaller than the size of 64×64 to be encoded, so that the transform unit having the smallest error against the original data may be selected FIG. 8 is a diagram explaining encoding information for each depth according to an embodiment of the present invention.

In an embodiment, the image encoding device 100 may encode and transmit information on the coding mode. For example, information on the coding mode may include information 800 on a partition type for the respective coding units according to the coding depth, information 810 on the prediction mode, and information 820 on the transform unit size.

The information 800 on the partition type is a data unit for prediction encoding of the current coding unit, and indicates information on the partition type whereby the predictor of the current coding unit is divided. For example, the current coding unit CU_0 having the size of 2N×2N may be used to be divided into any one type of a partition 802 having the size of 2N×2N, a partition 804 having the size of 2N×N, a partition 806 having the size of N×2N, and a partition 808 having the size of N×N. In this case, the information 800 on the partition type of the current coding unit may be set to indicate one of the partition 802 having the size of 2N×2N, the partition 804 having the size of 2N×N, the partition 806 having the size of N×2N, and the partition 808 having the size of N×N.

The information 810 on the prediction mode indicates a prediction mode of each partition. For example, the image encoding device 100 or the image decoding device 200 may determine in which of an intra mode 812, an inter mode 814, and a skip mode 816 the partition indicated by the information 800 on the partition type performs prediction encoding through the information 810 on the prediction mode. Further, the information 820 on the transform unit size indicates what transform unit the current coding unit is frequency-converted based on. For example, the transform unit may be one of the first intra transform unit size 822, the second intra transform unit size 824, the first inter transform unit size 826, and the second intra transform unit size 828.

In an embodiment, the image encoding device 200 may extract the information 800 on the partition type, the information 810 on the prediction mode, and the information 820 on the transform unit size for each coding unit for each depth, and may use the extracted information for decoding.

Figure 9:
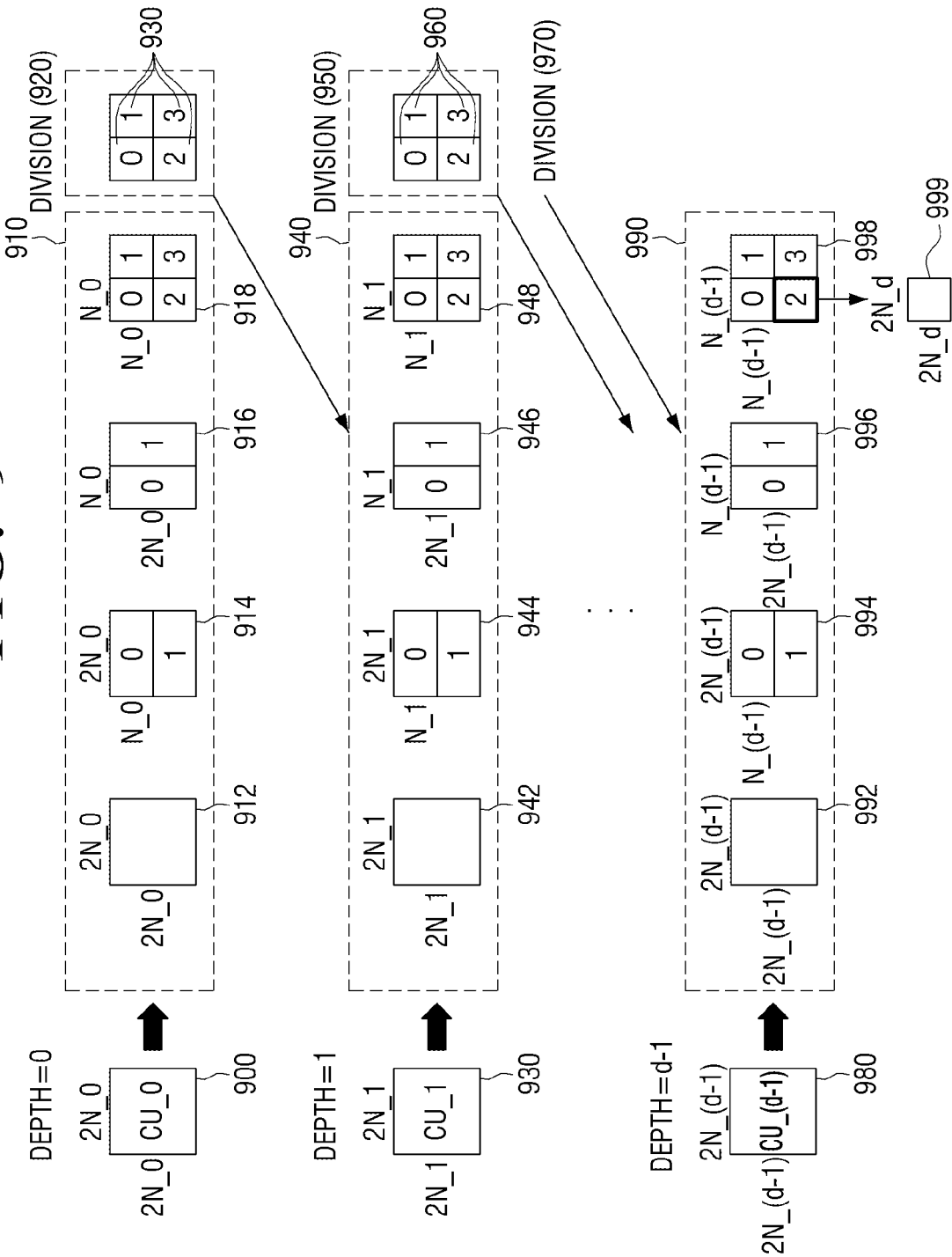
FIG. 9 is a diagram explaining coding units for each depth according to an embodiment of the present invention.

FIG. 9 is a diagram explaining coding units for each depth according to an embodiment of the present invention.

In order to indicate a change of depth, division information may be used. The division information indicates whether the coding unit of the current depth can be divided into the coding unit of a lower depth. Predictor 910 for prediction-coding the coding unit 900 of depth 0 having the size of 2N_0×2N_0 may include a partition type 912 having the size of 2N_0×2N_0, a partition type 914 having the size of 2N_0×N_0, a partition type 916 having the size of N_0×2N_0, and a partition type 918 having the size of N_0×N_0. Although only the partitions 912, 914, 916, and 918 of which the predictor is divided in a symmetric ratio are exemplified, the partition type is not limited thereto, but may include an asymmetric partition, a partition of a certain type, and a partition of a geometrical type.

For one partition type, prediction encoding may be repeatedly performed for one partition having the size of 2N_0×2N_0, two partitions having the size of 2N_0×N_0, two partitions having the size of N_0×2N_0, and four partitions having the size of N_0×N_0. With respect to the partitions having the sizes of 2N_0×2N_0, N_0×2N_0, 2N_0×N_0, and N_0×N_0, the prediction encoding may be performed in the intra mode and the inter mode. In a skip mode, only the prediction encoding may be performed with respect to the partition having the size of 2N_0×2N_0.

If a coding error caused by one of the partition types 912, 914, and 916 having the sizes of 2N_0×2N_0, 2N_0×N_0, and N_0×2N_0 is the smallest, it is not necessary any more to perform division at a lower depth. If the coding error caused by the partition type 918 having the size of N_0×N_0 is the smallest, the division is performed through changing the depth 0 to depth 1 (920), and the minimum coding error can be searched for by repeatedly encoding the coding units 930 of the partition type of depth 2 having the size of N_0×N_0.

A predictor 940 for prediction encoding of the coding unit 930 of depth 1 having the size of 2N_1×2N_1 (=N_0×N_0) may include a partition type 942 having the size of 2N_1×2N_1, a partition type 944 having the size of 2N_1×N_1, a partition type 946 having the size of N_1×2N_1, and a partition type 948 having the size of N_1×N_1. Further, if a coding error caused by the partition type 948 having the size of N_1×N_1 is the smallest, the division is performed through changing the depth 1 to depth 2 (950), and the minimum coding error can be searched for by repeatedly encoding the coding units of depth 2 having the size of N_2×N_2.

If the maximum depth is d, division information for each depth may be set until the depth becomes d−1, and the division information may be set up to depth d−2. That is, if the division is performed from the depth d−2 and the encoding is performed up to the depth d−1, the predictor 990 for prediction-coding the coding unit 980 of depth d−1 having the size of 2N_(d−1)×2N_(d−1) may include a partition type 992 having the size of 2N_(d−1)×2N_(d−1), a partition type 994 having the size of 2N_(d−1)×N_(d−1), a partition type 996 having the size of N_(d−1)×2N_(d−1), and a partition type 998 having the size of N_(d−1)×N_(d−1).

Among partition types, encoding through the prediction encoding may be repeatedly performed for one partition having the size of 2N_(d−1)×2N_(d−1), two partitions having the size of 2N_(d−1)×N_(d−1), two partitions having the size of N_(d−1)×2N_(d−1), and four partitions having the size of N_(d−1)×N_(d−1), and a partition type in which the minimum coding error occurs may be searched for. Even if the coding error caused by the partition type 998 having the size of N_(d−1)×N_(d−1) is the smallest, the maximum depth is d, and the coding unit CU_(d−1) of depth d−1 does not pass through a division process to a lower depth any more. Accordingly, the coding depth for the current maximum coding unit 900 may be determined as depth d−1, and the partition type may be determined as N_(d−1)×N_(d−1). Further, since the maximum depth is d, division information is not set with respect to the coding unit of depth d−1.

A data unit 999 may be called the minimum unit for the current maximum coding unit. In an embodiment, the minimum unit may be a square data unit having a size corresponding to a case where the minimum coding unit that is the lowermost coding depth is divided by 4. Through such a repeated coding process, the image encoding device 100 according to an embodiment may determine the coding depth by selecting the depth at which the smallest coding error occurs through comparison of coding errors for each depth of the coding unit 900, and the corresponding partition type and prediction mode may be set as the coding mode of the coding depth As described above, the coding depth may be determined by selecting the depth having the smallest error through comparison of the minimum coding errors for all depths 0, 1, . . . , d−1, and d. The coding depth, partition type of a prediction unit, and prediction mode may be encoded and transmitted as information on the coding mode. Further, since the coding unit should be divided from depth 0 to the coding depth, only the division information of the coding depth should be set to 0, and the division information for each depth excluding the coding depth should be set to 1.

In an embodiment, the image decoding device 200 may extract information on the coding depth for the coding unit 900 and the prediction unit, and may use the extracted information to decode the coding unit 912 of image data. In an embodiment, the image decoding device 200 may grasp the depth at which the division information is 0 as the coding depth using the division information for each depth, and may perform decoding using information on the coding mode for the corresponding depth.

Figure 10:
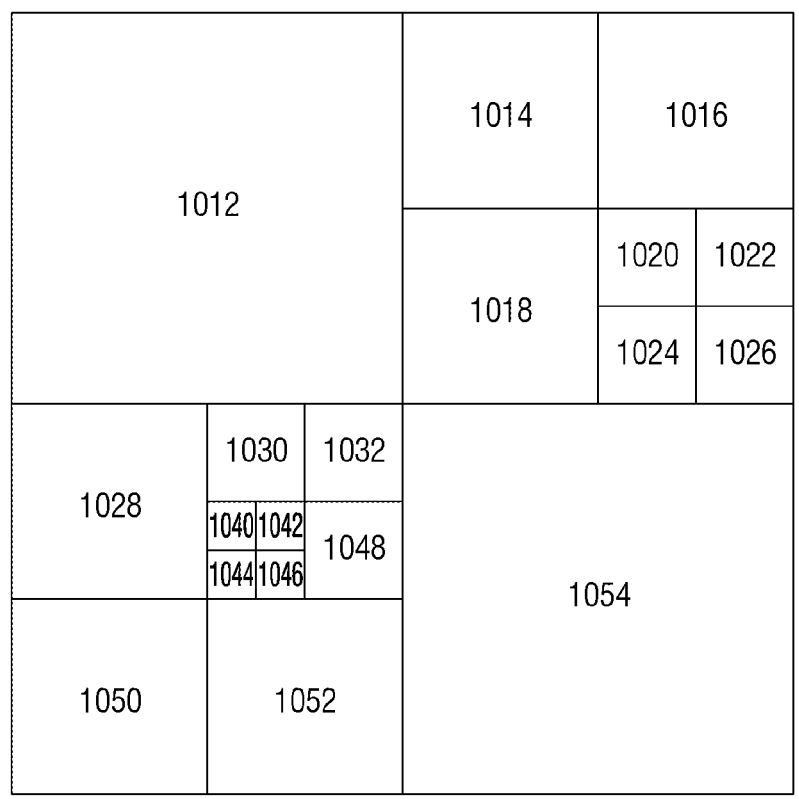
FIGS. 10 to 12 are diagrams explaining the relationship among a coding unit, a predictor, and a frequency converter according to an embodiment of the present invention.
Figure 11:
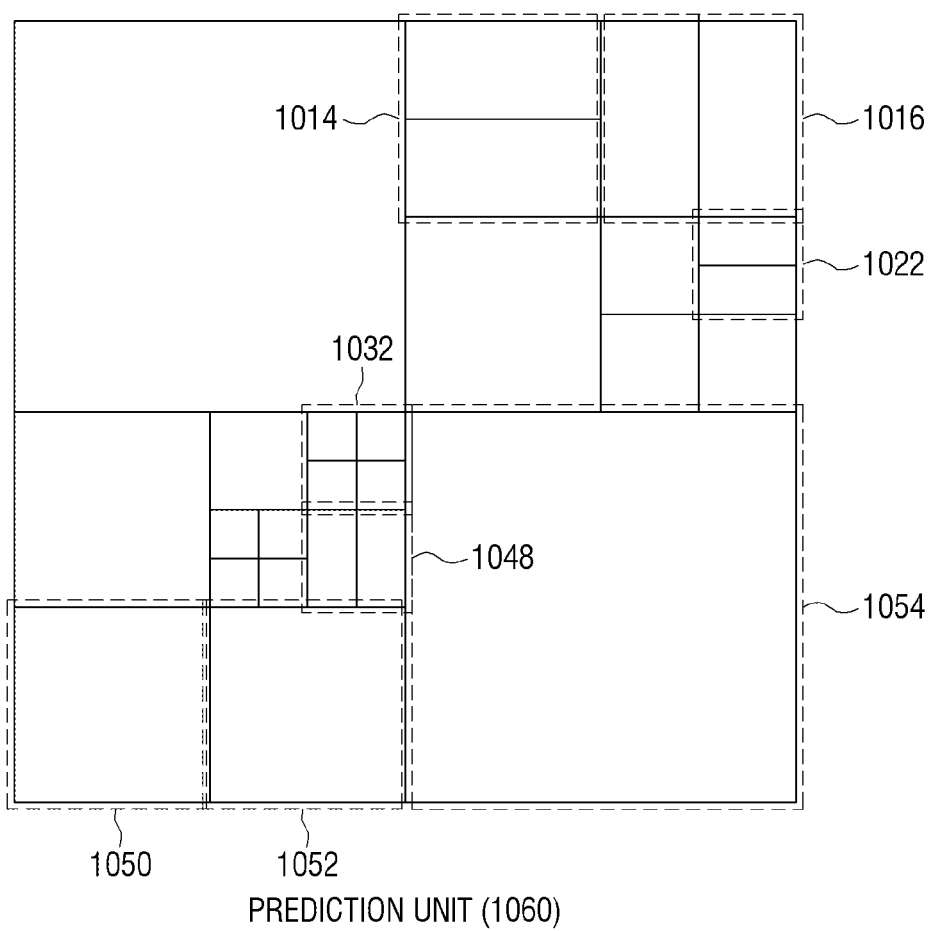
Figure 12:
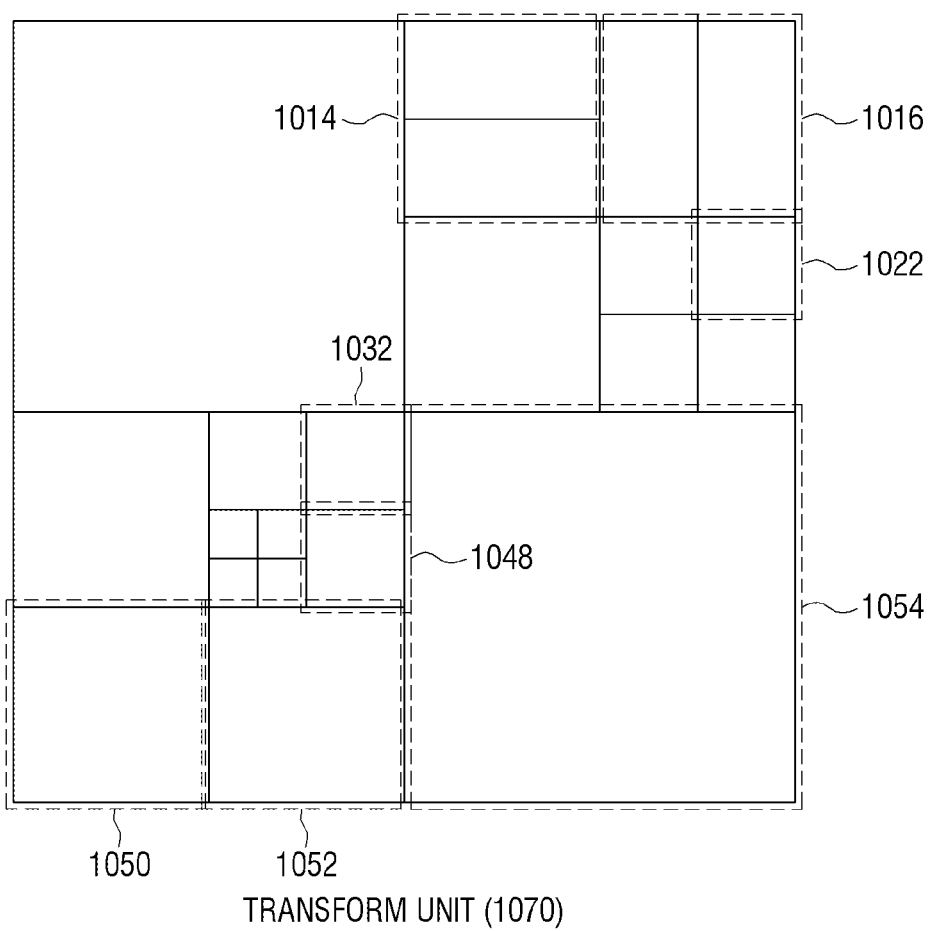

FIGS. 10 to 12 are diagrams explaining the relationship among a coding unit, a predictor, and a frequency converter according to an embodiment of the present invention.

Referring to FIG. 10, a coding unit 1010 is illustrated, and referring to FIG. 11, a prediction unit 1060 is illustrated. Further, referring to FIG. 12, a transform unit 1070 is illustrated.

In an embodiment, in the coding unit 1010, the maximum coding unit is divided according to respective depths determined by the image encoding device 100. The prediction unit 1060 includes partitions of prediction units obtained by dividing the coding unit 1010 into the coding units according to the respective depths, and the transform unit 1070 includes units obtained by dividing the coding unit according to the respective depths.

In the case of the coding unit 1010 for each depth, if it is assumed that the depth of the maximum coding unit is 0, the depth of the first coding units 1012 and 1054 is 1, and the depth of the second coding units 1014, 1016, 1018, 1028, 1050, and 1052 is 2. Further, the depth of the third coding units 1020, 1022, 1024, 1026, 1030, 1032, and 1048 is 3, and the depth of the fourth coding units 1040, 1042, 1044, and 1046 is 4.

Among the prediction units 1060, some partitions 1014, 1016, 1022, 1032, 1048, 1050, 1052, and 1054 are in the form in which the coding units are divided. That is, the first partitions 1014, 1022, 1050, and 1054 are of a 2N×N type, the second partitions 1016, 1048, and 1052 are of an N×2N type, and the third partition 1032 is of an N×N type. The prediction units and partitions of the coding units 1010 for each depth are equal to or smaller than the respective coding units.

With respect to the image data of parts 1052 of the transform units 1070, the frequency transform or inverse frequency transform is performed in the unit of data having a size that is smaller than the coding unit. Further, as compared with the corresponding prediction unit and partition among the prediction units 1060, the transform units 1014, 1016, 1022, 1032, 1048, 1050, 1052, and 1054 are in the unit of data having difference sizes or types.

That is, in an embodiment, the image encoding device 100 and the image decoding device 200 may perform intra prediction/motion estimation/motion compensation, and even frequency transform/inverse frequency transform for the same coding unit based on separate data units. Accordingly, the optimum coding unit is determined by performing reflexive encoding of the coding units of a hierarchical structure by zones for the maximum coding unit, and thus the coding units according to a tree structure may be configured. The coding information may include division information for the coding unit, partition type information, prediction mode information, and transform unit size information.

In an embodiment, the image encoding device 100 may output coding information for the coding units according to the tree structure, and the image decoding device 200 may extract the coding information for the coding units according to the tree structure by parsing the received bit streams. The division information indicates whether the current coding unit is divided into coding units of lower depths. If the division information of the current depth d is 0, it means that the current coding unit has not been divided into lower coding units any more. The partition type information, prediction mode, and transform unit size information may be defined in relation to the coding depth. In the case where the division should be further performed in one stage according to the division information, the encoding should be independently performed for each coding unit of the 4 divided lower depths.

The prediction mode may be indicated as one of an intra mode, an inter mode, and a skip mode. The intra mode and the inter mode may be defined in all partition types, and the skip mode may be defined only in the partition type of 2N×2N. The partition type information may indicate one of symmetric partition types of 2N×2N, 2N×N, N×2N, and N×N in which the height or width of the prediction unit is divided in a symmetric ratio, and asymmetric partition types of 2N×nU, 2N×nD, nL×2N, and nR×2N in which the height or width of the prediction unit is divided in an asymmetric ratio. The asymmetric partition types of 2N×nU and 2N×nD are in the form in which the height is divided in the ratio of 1:n (n is an integer that is larger than 1) and n:1, and the asymmetric partition types of nL×2N and nR×2N are in the form in which the width is divided in the ratio of 1:n and n:1.

Two kinds of transform unit sizes may be set in the intra mode, and two kinds of transform unit sizes may be set in the inter mode. That is, if the transform unit division information is 0, the size of the transform unit may be set to the current coding unit size of 2N×2N. If the transform unit division information is 1, the size of the transform unit may be set to the divided current coding unit size. Further, if the partition type of the current coding unit having the size of 2N×2N is the symmetric partition type, the size of the transform unit may be set to N×N, whereas if the partition type is the asymmetric partition type, the size of the transform unit may be set to N/2×N/2.

In an embodiment, the coding information of the coding units according to the tree structure may include at least one of the coding unit of the coding depth, the prediction unit, and the minimum unit. The coding unit of the coding depth may include one or more prediction units and minimum units having the same coding information. Accordingly, if the coding information possessed by adjacent data units is confirmed, it may be confirmed whether the coding information is included in the coding unit of the same coding depth. Further, since the coding unit of the corresponding coding depth can be confirmed using the coding information possessed by the data units, distribution of the coding depths in the maximum coding unit can be analogized. Accordingly, in the case of predicting the current coding unit with reference to the neighboring data units, the coding information of the data unit in the coding units for each depth that are adjacent to the current coding unit may be directly referred to be used.

In another embodiment, in the case where the prediction encoding of the current coding unit is performed with reference to the neighboring coding units, the neighboring coding units may be referred to by searching for data adjacent to the current coding unit in the coding unit for each depth using the coding information of the adjacent coding units for each depth.

Figure 13:
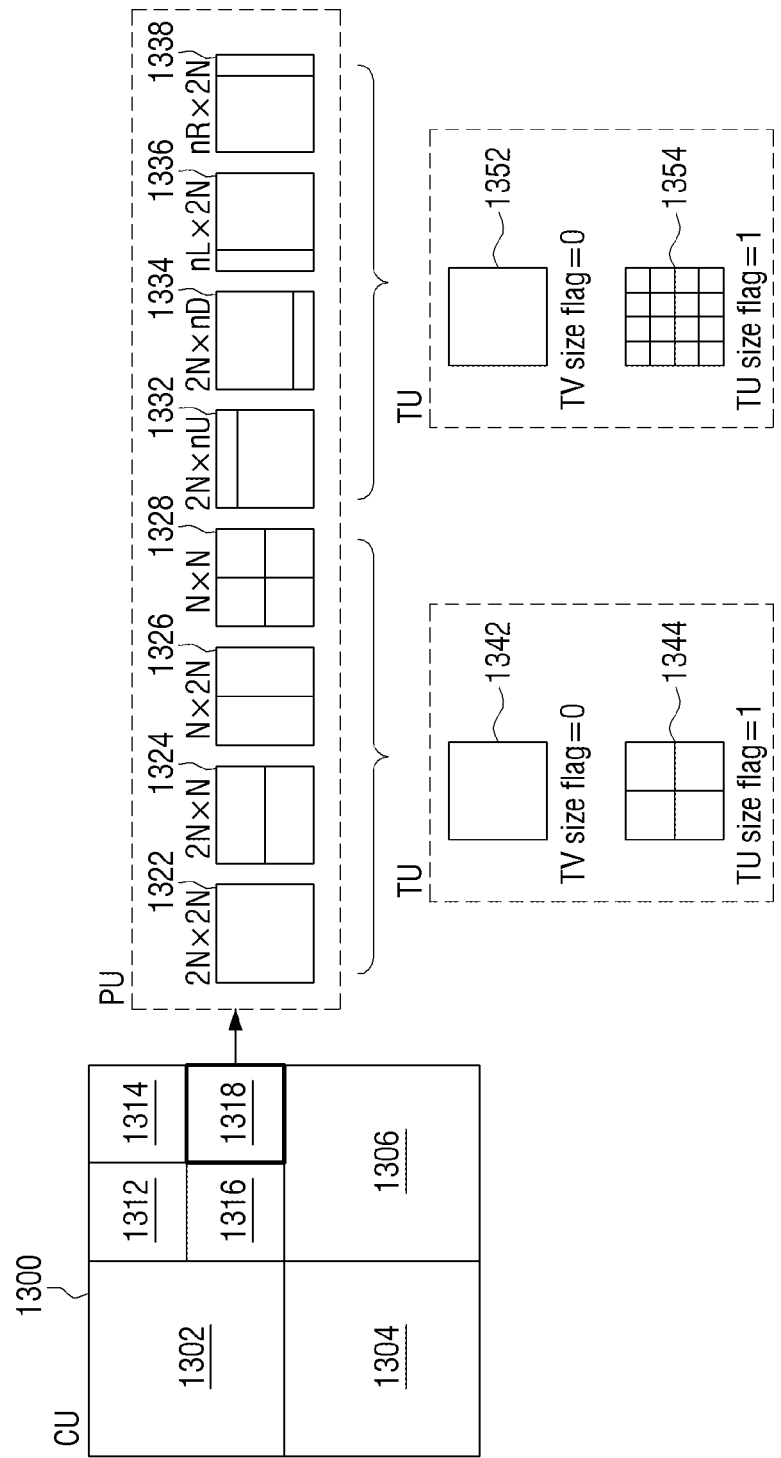
FIG. 13 is a diagram explaining the relationship among a coding unit, a predictor, and a transform unit according to encoding mode information.

FIG. 13 is a diagram explaining the relationship among a coding unit, a predictor, and a transform unit according to encoding mode information.

The maximum coding unit 1300 may include coding units 1302, 1304, 1306, 1312, 1314, 1316, and 1318 of the coding depth. Among them, one coding unit 1318 may be a coding unit (or basic coding unit) of the coding depth, and thus the division information may be set to 0.

The partition type information of the coding unit 1318 having the size of 2N×2N may be set to one of partition types of 2N×2N 1322, 2N×N 1324, N×2N 1326, N×N 1328, 2N×nU 1332, 2N×nD 1334, nL×2N 1336, and nR×2N 1338. In the case where the partition type information is set to one of the symmetric partition types of 2N×2N 1322, 2N×N 1324, N×2N 1326, and N×N 1328, if the transform unit division information (TU size flag) is 0, the transform unit 1324 of 2N×2N may be set, whereas if the transform unit division information is 1, the transform unit 1344 of N×N may be set. In the case where the partition type information is set to one of the asymmetric partition types of 2N×nU 1332, 2N×nD 1334, nL×2N 1336, and nR×2N 1338, if the transform unit division information (TU size flag) is 0, the transform unit 1352 of 2N×2N may be set, whereas if the transform unit division information is 1, the transform unit 1354 of N/2×N/2 may be set.

The transform unit division information (TU size flag) is a kind of transform index, and the size of the transform unit corresponding to the transform index may be changed according to the prediction unit type of the partition type of the coding unit. For example, in the case where the partition type information is set to one of the symmetric partition types of 2N×2N 1322, 2N×N 1324, N×2N 1326, and N×N 1328, if the transform unit division information is 0, the transform unit 1342 of 2N×2N may be set, whereas if the transform unit division information is 1, the transform unit 1344 of N×N may be set. In the case where the partition type information is set to one of the asymmetric partition types of 2N×nU 1332, 2N×nD 1334, nL×2N 1336, and nR×2N 1338, if the transform unit division information (TU size flag) is 0, the transform unit 1352 of 2N×2N may be set, whereas if the transform unit division information is 1, the transform unit 1354 of N/2×N/2 may be set.

Although the above-described transform unit division information (TU size flag) is a flag having a value of 0 or 1, in an embodiment, the transform unit division information is not limited to the flag of 1 bit, but may be increased in the order of 0, 1, 2, 3, and so on according to the setup. The transform unit division information may be used as one embodiment of the transform index. In this case, in an embodiment, if the transform unit division information is used together with the maximum size and the minimum size of the transform unit, the size of the transform unit that is actually used can be expressed. In an embodiment, the image encoding device 100 may encode the maximum transform unit size information, the minimum transform unit size information, and the maximum transform unit division information. The encoded maximum transform unit size information, minimum transform unit size information, and maximum transform unit division information may be inserted into the SPS. In an embodiment, the image decoding device 200 may perform video decoding using the maximum transform unit size information, the minimum transform unit size information, and the maximum transform unit division information.

For example, (a) if the current coding unit size is 64×64, and the maximum transform unit size is 32×32, (a-1) the transform unit size may be set to 32×32 in the case where the transform unit division information is 0, (a-2) the transform unit size may be set to 16×16 in the case where the transform unit division information is 1, and (a-3) the transform unit size may be set to 8×8 in the case where the transform unit division information is 2. As another example, (b) if the current coding unit size is 32×32, and the minimum transform unit size is 32×32, (b-1) the transform unit size may be set to 32×32 in the case where the transform unit division information is 0. In this case, since the transform unit size is unable to be smaller than 32×32, the transform unit division information is unable to be set any more. As still another example, (c) if the current coding unit size is 64×64, and the maximum transform unit division information is 1, the transform unit division information may be 0 or 1, and thus other transform unit division information is unable to be set. Accordingly, if it is defined that the maximum transform unit division information is "MaxTransformSizeIndex", the minimum transform unit size is "MinTransformSize", and the size of the transform unit in the case where the transform unit division information is 0, that is, the size of the root transform unit RootTu is "RootTuSize", the possible minimum transform unit size "CurrMinTuSize" in the current coding unit may be defined as in the following relation expression (1).

$$\text{CurrMin}T u\text{Size} = \max(\text{MinTransformSize}, \text{Root}Tu\text{Size}/(2^{\wedge}\text{MaxTransformSizeIndex})) \quad (1)$$

As compared with the possible minimum transform unit size "CurrMinTuSize" in the current coding unit, the root transform unit size "RootTuSize" may indicate the maximum transform unit size that can be selected on the system. That is, according to the relation expression (1), since "RootTuSize/(2^MaxTransformSizeIndex)" is the transform unit size obtained by dividing the root transform unit size "RootTuSize" as many as the number of times corresponding to the maximum transform unit division information, and "MinTransformSize" is the minimum transform unit size, a smaller value between them may be the possible minimum transform unit size "CurrMinTuSize" in the current coding unit.

In an embodiment, the root transform unit size "RootTuSize" may differ according to the prediction mode. For example, if the current prediction mode is the inter mode, the "RootTuSize" may be determined according to the following relation expression (2). In the relation expression (2), "MaxTransformSize" denotes the maximum transform unit size, and "PUSize" denotes the current prediction unit size.

$$RootTuSize=\min(MaxTrtansformSize, PUSize) \quad (2)$$

That is, if the current prediction mode is the inter mode, the root transform unit size "RootTuSize" that is the transform unit in the case where the transform unit division information is 0 may be set to a smaller value between the maximum transform unit size and the current prediction unit size. If the current partition unit prediction mode is the intra mode, "RootTuSize" may be determined according to the following relation expression (3). "PartitionSize" denotes the current partition unit size.

$$RootTuSize=\min(MaxTransformSize, PartitionSize) \quad (3)$$

That is, if the current prediction mode is the intra mode, the root transform unit size "RootTuSize" may be set to a smaller value between the maximum transform unit size and the current partition unit size. However, in an embodiment, the root transform unit size "RootTuSize" which is the current maximum transform unit size that varies according to the partition unit prediction mode is merely exemplary, and it is to be noted that the factor that determines the current maximum transform unit size is not limited thereto.

As described above, in an embodiment, the image encoding device 100 and the image decoding device 200 perform encoding and decoding through division of the maximum coding unit into coding units that is equal to or smaller than the maximum coding unit. The prediction unit and the transform unit used in the prediction process and the transform process may be determined based on the costs independently of other data units. As described above, the optimum coding unit is determined by performing reflexive encoding of the coding units of a hierarchical structure, which are included in the maximum coding unit, and thus the data units according to the tree structure may be configured. That is, for each maximum coding unit, the coding units of the tree structure, the prediction units of the tree structure, and the transform units may be determined. For decoding, it is necessary to transmit hierarchical information that is information indicating structural information of the data units having such a hierarchical structure and information excluding the hierarchical information for decoding.

The information related to the hierarchical structure is information that is necessary to determine the encoding unit of the tree structure, the prediction unit of the tree structure, and the transform unit of the tree structure as described above with reference to FIGS. 10 to 12, and may include the maximum coding unit size, coding depth, partition information of the prediction unit, split flag indicating whether to divide the coding unit, transform unit size information, and transform unit division flag (TU size flag) indicating whether to divide the transform unit. Except for the hierarchical structure information, the coding information prediction mode information of intra/inter prediction applied to the respective prediction units, motion vector information, prediction direction information, color component information applied to the corresponding data unit if a plurality of color components are used, and transform coefficient information.

The hierarchical information and the information excluding the hierarchical information may be called syntax elements that are subjects of entropy encoding and decoding. Hereinafter, in an embodiment, a process of determining a context model for the entropy encoding and decoding of the transform coefficient level.

Figure 14:
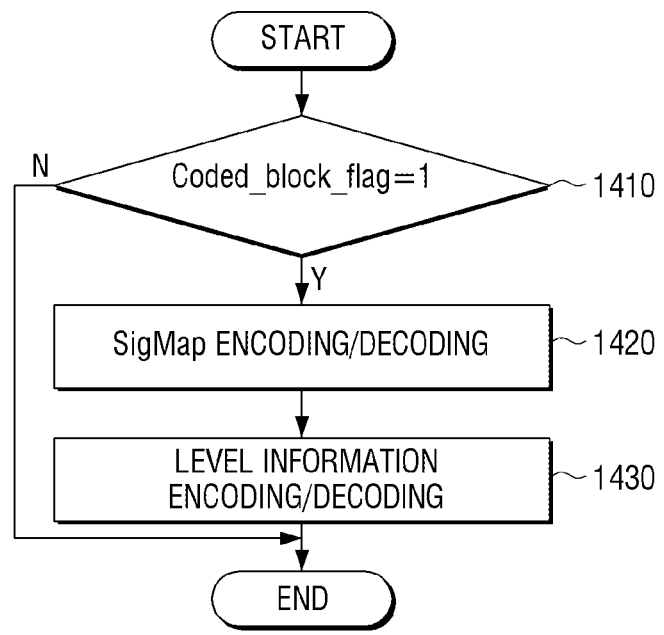
FIG. 14 is a flowchart explaining a process for entropy encoding and decoding of transform coefficient information included in a transform unit according to an embodiment of the present invention.

FIG. 14 is a flowchart explaining a process for entropy encoding and decoding of transform coefficient information included in a transform unit according to an embodiment of the present invention.

Referring to FIG. 14, entropy encoding and decoding may be first performed with respect to coded_block_flag indicating whether a transform coefficient (hereinafter referred to as "significant transform coefficient") that is not 0 exists among transform coefficients included in the current transform unit (S1410). If coded_block_flag is 0, only transform coefficients that are 0 exist in the current transform unit, and thus only the value of 0 is entropy-encoded and decoded as the coded_block_flag, whereas transform coefficient level information is not entropy-encoded and decoded.

If the significant transform coefficient exists in the current transform unit, a significance map (SigMap) indicating the position of the significant transform coefficient may be entropy-encoded and decoded (S1420). The significance map may be composed of specific information indicating a significant bit and the position of the last significant transform coefficient. The significant bit indicates whether the transform coefficient according to each scanning index is a significant transform coefficient or 0, and may be expressed using significant_coeff_flag[i]. As described later, the significance map is set to a subset unit of a specific size through division of the transform unit. Accordingly, significant_coeff_flag[i] may indicate whether the transform coefficient of the i-th scanning among the transform coefficients included in one subset included in the transform unit is 0.

According to H.264 in the related art, a flag (end-of-block) indicating whether each of the significant transform coefficients is the last significant coefficient is separately entropy-encoded and decoded. However, according to an embodiment of the present disclosure, the position information of the last significant transform coefficient may be entropy-encoded and decoded as it is. As described above, in an embodiment, the transform unit is not limited to the size of 4×4 that is used in the H.264 in the related art, but may have larger sizes, such as 8×8, 16×16, and 32×32. Further, the transform unit may have further larger sizes, such as 64×64, 128×128, and 256×256. If the flag (end-of-block) indicating whether each of the significant transform coefficients included in the transform unit having the large size is the last significant coefficient is separately entropy-encoded and decoded, the size of the flag (end-of-block) is increased to cause inefficiency.

Accordingly, in an embodiment, the position information of the last significant transform coefficient may be entropy-encoded and decoded as it is. For example, if the position of the last significant transform coefficient is (x, y) (x and y are integers), the (x, y) coordinate value may be entropy-encoded and decoded as it is.

The image encoding device 100 may perform level information of the significant transform coefficient and encoding of the level information, and the image decoding device 200 may decode the level information (s1430). The details of the level information will be described later. The entropy encoding and decoding process as described above with reference to FIG. 14 is a coefficient coding scheme according to an embodiment. The image encoding device 100 or the image decoding device 200 may perform encoding or decoding process using various coefficient coding schemes according to a specific basis for more efficient encoding or decoding. The details of various coefficient coding schemes will be described later.

Figure 15:
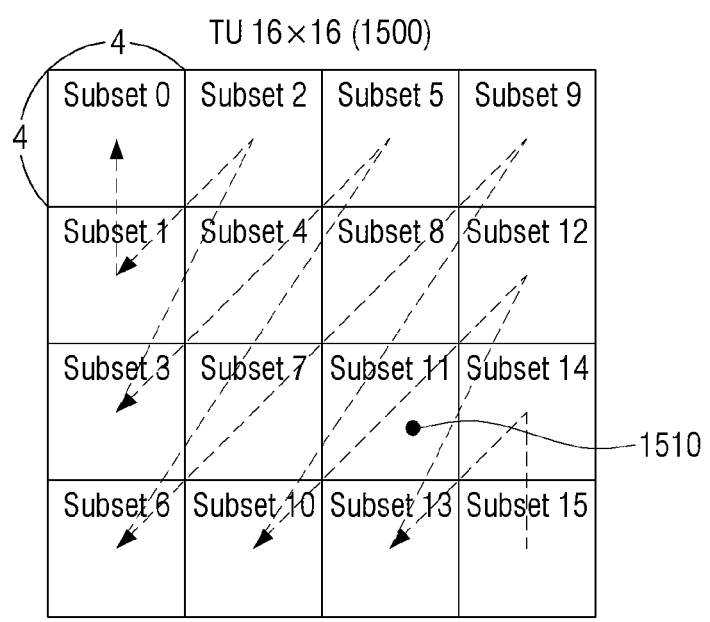
FIG. 15 is a diagram explaining sub zones into which a transform unit is divided according to an embodiment of the present invention.

FIG. 15 is a diagram explaining sub zones into which a transform unit is divided according to an embodiment of the present invention.

Although FIG. 15 illustrates a case where a transform unit 1500 has a size of 16×16, the transform unit 1500 is not limited to the size of 16×16, but may have various sizes, such as 4×4 to 32×32. According to circumstances, the size of the transform unit 1500 may be 64×64, 128×128, or 256×256. Further, the transform unit may not be a square transform unit, but may be a rectangular transform unit. For example, the transform unit 1500 may also be, for example, 8×4, 4×8, 16×8, 8×16, 32×16, 16×32, 64×32, 32×64, 16×4, 4×16, 32×8, 8×32, 64×16, or 16×64.

Referring to FIG. 15, to achieve entropy encoding and decoding of transform coefficients included in the transform unit 1500, the transform unit 1500 may be divided into subsets (or sub zones) having a specific size. In an embodiment, the transform unit 1500 may be divided into subsets having a size of 4×4. The transform unit 1500 may be divided into 16 subsets, and in the unit of each subset, the transform coefficient information may be entropy-encoded and decoded. If the size of the subset differs, the number of subsets into which the transform unit 1500 is divided may also differ.

The transform coefficient information that is entropy-encoded and decoded may include a significance map (Sig-Map), a first threshold value flag (greaterthan1 flag, hereinafter referred to as "GT1 flag") indicating whether the significant transform coefficient included in the subset has a preset first threshold value, for example, a value that is larger than 1, a second threshold value flag (Greaterthan2 flag, hereinafter referred to as "GT2 flag") indicating whether the significant transform coefficient included in the subset has a preset second threshold value, for example, a value that is larger than 2, and information (level-3) indicating the level of the significant transform coefficient that is larger than the second threshold value. In the following description, although it is assumed that the first threshold value is 1 and the second threshold value is 2, the first and second threshold values are not limited thereto, but may be changed. The first threshold value flag (GT1 flag) is set with respect to only the transform coefficient of which the significance map is 1, but is not set with respect to the transform coefficient of which the significance map is 0. Further, the second threshold flag (GT2 flag) is set with respect to only the transform coefficient of which the first threshold value flag is 1.

In FIG. 15, it is assumed that the subset including the last significant transform coefficient is subset 11 1510. In the entropy encoding and decoding process of the transform coefficient information that is performed in the unit of a subset, the transform coefficient information of the respective subsets are entropy-encoded and decoded backward according to the illustrated scanning order from the subset 11 1510 including the last significant transform coefficient. According to circumstances, the scanning may be performed forward from the subset 0 to the subset 11 1510 including the last significant transform coefficient, and the transform coefficient information of the respective subsets may be entropy-encoded and decoded. Further, although FIG. 15 illustrates an embodiment in which scanning is performed in a diagonal scanning direction (or scanning order), the scanning may be performed in a horizontal or vertical direction according to a preset reference.

Figure 16:
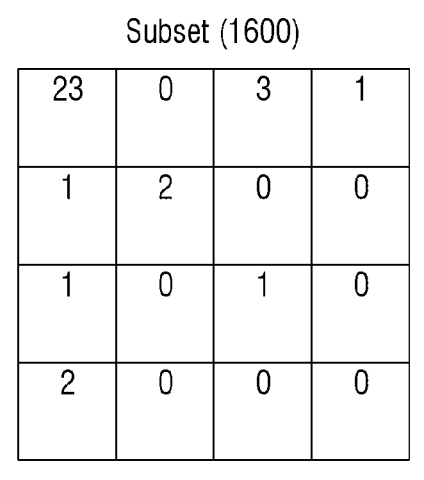

FIG. 16 is a diagram explaining an example of a sub zone included in a transform unit.

Referring to FIGS. 15 and 16, it is assumed that any one subset (or sub zone) included in the transform unit 1500 illustrated in FIG. 15 includes transform coefficients having a size of 4×4 as illustrated in FIG. 16. As described above, according to an embodiment, the significance map (Sig-Map), the first threshold value flag (GT1 flag), and the second threshold value flag (GT2 flag) are entropy-encoded and decoded in the unit of a subset.

Figure 17:
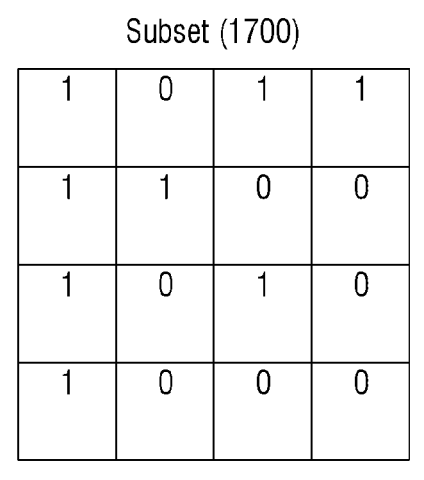

FIG. 17 is a diagram explaining a significance map corresponding to a subset.

Referring to FIGS. 16 and 17, a significance map (Sig-Map) 1700 having a value of 1 is set with respect to the significant transform coefficients having a value that is not 0 among the transform coefficients included in the subset 1600 of FIG. 16. The significance map (SigMap) 1700 is entropy-encoded and decoded using a preset context model.

Figure 18:
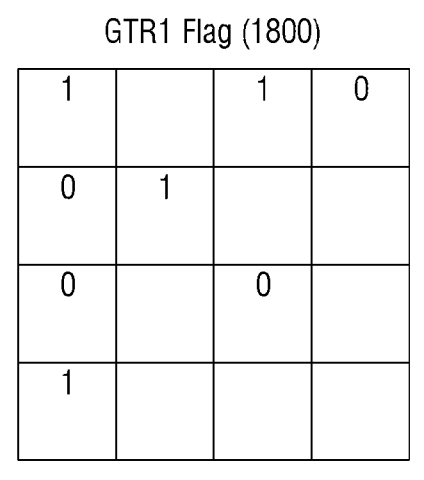

FIG. 18 is a diagram explaining a first threshold value flag corresponding to a subset.

Referring to FIGS. 16 to 18, a first threshold flag (GT1 flag) 1800 indicating whether the corresponding transform coefficient is the first threshold value is set with respect to the transform coefficient having a value of 1. If the first threshold value flag (GT1 flag) 1800 is 1, it indicates that the corresponding transform coefficient is a transform coefficient having a value that is larger than 1, whereas if the first threshold value flag (GT1 flag) 1800 is 0, it indicates that the corresponding transform coefficient is a transform coefficient having a value of 1.

Figure 19:
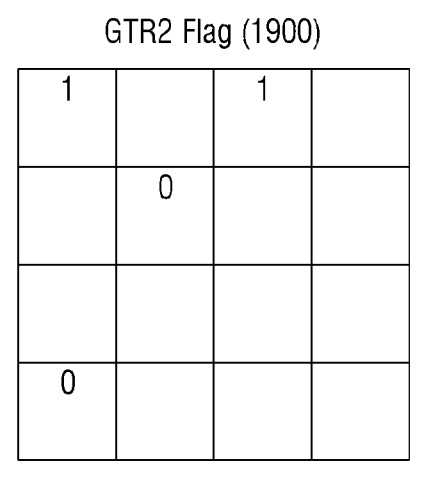

FIG. 19 is a diagram explaining a second threshold value flag corresponding to a subset.

Referring to FIGS. 16 to 19, a second threshold value flag (GT2 flag) 1900 indicating whether the corresponding transform coefficient is the second threshold value is set with respect to the transform coefficient of which the first threshold value flag (GT1 flag) 1800 is set to 1. If the second threshold value flag (GT2 flag) 1900 is 1, it indicates that the corresponding transform coefficient is a transform coefficient having a value that is larger than 2, whereas if the second threshold value flag (GT2 flag) 1900 is 0, it indicates that the corresponding transform coefficient is a transform coefficient having a value of 2.

Referring to FIG. 19, the level information of the transform coefficients of which the second threshold value flag (GT2 flag) 1900 is 1, that is, the transform coefficients having values of 23 and 3 in FIG. 16, is entropy-encoded and decoded as it is. In this case, since the transform coefficient of which the second threshold value flag (GT2 flag) 1900 is 1 is a transform coefficient having a value that is larger than 2, a value (level-3) that is obtained by subtracting 3 from the level of the corresponding transform coefficient is encoded as the level information of the corresponding transform coefficient. In the above-described example, during the entropy encoding, a value of 20 is encoded as the level information instead of a value of 23, and a value of 0 is encoded as the level information instead of a value of 3. During the entropy decoding, the level information of the corresponding transform coefficient can be restored by performing entropy decoding of the level information (level-3) of the transform coefficient of which the second threshold value flag (GT2 flag) 1900 is 1 and by adding a value of 3 to the entropy-decoded level information.

FIG. 20 is a diagram explaining transform coefficients included in one subset and entropy-encoded and decoded transform coefficient information.

In an embodiment, the significance map (SigMap), the first threshold value flag (GT1 flag), the second threshold value flag (GT2 flag), and the level information (level-3), which indicate the position and level information of the significant transform coefficient, are entropy-encoded and decoded.

FIGS. 21A to 21C are diagrams explaining a zone including a plurality of sub zones according to an embodiment of the present invention.

Referring to FIGS. 21A to 21C, a transform unit that is divided into a plurality of zones and a plurality of sub zones is disclosed. Further, information related to significant coefficients of the plurality of sub zones may be encoded by an entropy encoder, and may be decoded by an entropy decoder. The entropy encoder may set the plurality of zones or the plurality of sub zones based on previously divided blocks. In another embodiment, the plurality of zones or the plurality of sub zones may be set by another constituent element that is separate from the entropy encoder. For example, the image encoding device 100 may include a hierarchical encoder, and the hierarchical encoder may divide the transform unit into the plurality of zones or the plurality of sub zones. In the description, the image encoding device is used as the same meaning as the entropy encoding device. Further, the image decoding device is used as the same meaning as the entropy decoding device. Further, the entropy encoder may set information related to significant coefficients included in the divided zones or sub zones. The information related to the significant coefficients may include a zone flag, a sub zone flag, a zone index, or a sub zone index. In a similar manner to the entropy encoding device, the entropy decoding device may determine information on the respective zones or the respective sub zones as the entropy decoder decodes information on the significant coefficients of the respective zones or the respective sub zones. As another example, the entropy decoding device may include a hierarchical decoder. In this case, the entropy decoder may decode the information on the respective zones or the respective sub zones, and the hierarchical decoder may determine the respective zones or the respective sub zones. On the other hand, the plurality of zones or the plurality of sub zones may be set in various schemes.

Referring to FIG. 21A, zones and sub zones according to a first embodiment are illustrated. The transform unit may correspond to a size of N×N. The transform unit may be divided into three sizes of 4, 4, and N−8 on the horizontal axis, and may be divided into three sizes of 4, 4, and N−8 on the vertical axis. Accordingly, the transform unit may include four blocks having a size of 4×4, two blocks having a size of (N−8)×4, two blocks having a size of 4×(N−8), and one block having a size of (N−8)×(N−8). The respective blocks may be sub zones. For convenience in explanation, an embodiment in which the blocks are formed through division on the horizontal axis and the vertical axis has been described. However, the transform unit may be successively divided into four blocks having a size of 4×4, two blocks having a size of (N−8)×4, two blocks having a size of 4×(N−8), and one block having a size of (N−8)×(N−8). The size for division into the zones and the sub zones is not specified to 4, but various sizes may be used. The division size may be a determined value, or may be specified in a slice header, a PPS, or an SPS.

The transform unit may be scanned in a diagonal direction. Accordingly, the zones and the sub zones may be set based on the diagonal direction. The respective zones may be set to a form that surrounds the previous zones. Further, the sub zones may be set based on the zones and the diagonal direction. For example, the left uppermost end block may be set as the 0-th sub zone. The right block of the 0-th sub zone may be set as the first sub zone, and the left lower end block in the diagonal direction may be set as the second sub zone. Based on only the diagonal direction, the right uppermost end block becomes the third sub zone, but since the right uppermost end block is a different zone, a block in the same zone may be set as the next-priority sub zone. Accordingly, the lower end block of the first sub zone may be set as the third sub zone. Further, the right block of the first sub zone may be set as the fourth sub zone, and the left lowermost end block in the unset left lower end diagonal direction may be set as the fifth sub zone. The lower end block of the fourth sub zone may be set as the sixth sub zone, and the block in the left lower end diagonal direction of the sixth sub zone may be set as the seventh sub zone. Last, the right lowermost end block may be set as the eighth sub zone.

The 0-th zone z0 may be set to include one 0-th sub zone. The first zone z1 may be set to include the first sub zone, the third sub zone, and the second sub zone surrounding the 0-th sub zone. The second zone z2 may be set to include the remaining sub zones. The transform unit may be set to the zones and sub zones in a different type. The zones may be first set, and then the sub zones may be set. Further, the sub zones may be first set, and then the zones may be set. Further, even if the sub zones are first set, the order of the respective sub zones may be set after setting the zones.

Each of the respective sub zones includes a transform coefficient. As described above, the transform coefficient that is not 0 is called a significant transform coefficient. Further, the significant transform coefficients in one frame mean an image in a frame. Accordingly, the entropy encoding device may transmit the significant transform coefficients to the entropy decoding device, and the entropy decoding device may restore and display the image using the received significant transform coefficients. If the received amount of significant transform coefficient data is large, the entropy decoding device may display an image of a high picture quality that is similar to the original image. However, it takes a long time to transmit and decode the image, and the decoding task carries a heavy load. If the received amount of significant transform coefficient data is smaller, transmission time can be shorter, and the decoding can be quickly performed. However, the image quality may deteriorate. Accordingly, the entropy encoding device and the entropy decoding device require to perform encoding and decoding of an optimum amount of data in consideration of the encoding and decoding loads, transmission time, and image quality.

The entropy encoding device may encode the significant transform coefficients in a preset coefficient coding scheme among several coefficient coding schemes using information on the divided zones and sub zones. In an embodiment, the entropy encoding device divides the transform unit into a plurality of zones, and divides each of the plurality of zones into a plurality of sub zones. The respective sub zones may include significant transform coefficients, and all the transform coefficients may be 0.

The entropy encoding device may set a value of a zone flag of the last zone in which the sub zone including the significant transform coefficient among the plurality of zones is included. For example, referring to FIG. 21A, as described above, the 0-th zone z0 may include the 0-th sub zone, the first zone z1 may include the first sub zone, the third sub zone, and the second sub zone, and the second zone z2 may include the remaining sub zones. If only the 0-th sub zone includes the significant transform coefficient, the last zone including the significant transform coefficient is the 0-th zone z0. Accordingly, the value of the zone flag of the 0-th zone z0 is set to 1. Since the initial value of the zone flag and the sub zone flag may be 0, setting of the zone flag or the sub zone flag may mean changing of the value to 1. The fourth to eighth sub zones may not include the significant transform coefficient, but at least one of the first to third sub zones may include the significant transform coefficient. Since the first to third sub zones are included in the first zone z1, the last zone that includes the significant transform coefficient is the first zone z1. Accordingly, the zone flag of the first zone z1 may be set.

Further, if the divided sub zones include the significant transform coefficient, the entropy encoding device may set the sub zone flag with respect to the divided sub zones. For example, if the first sub zone includes the significant transform coefficient, the entropy encoding device may set the sub zone flag of the first sub zone to 1.

That is, the zone flag is a flag indicating whether the significant transform coefficients are distributed in the zone. Further, the sub zone flag is a flag indicating whether the sub zone of a specific size included in the zone includes the significant transform coefficient.

The zone flag may be set for each transform unit. Further, the zone flag may be encoded by context-based adaptive binary arithmetic coding (CABAC). The context for the zone flag coding may be determined based on various pieces of information. For example, the various pieces of information may include a corresponding zone index, transform unit size, coding unit size, encoded block type (e.g., intra/inter coding unit), component type (e.g., luma/chroma), and prediction information (e.g., partition mode and prediction mode).

Further, the sub zone flag may be included as information for the respective zones. The sub zone flag may be encoded by fixed length coding. The context for the sub zone flag coding may be determined based on various pieces of information. For example, the various pieces of information may include a corresponding zone index, zone flag, sub zone index, significant sub zone flag, transform unit size, coding unit size, encoded block type (e.g., intra/inter coding unit), component type (e.g., luma (luminance)/chroma (chrominance)), and prediction information (e.g., partition mode and prediction mode).

In an embodiment, if the sub zone flag is set prior to the zone flag, the zone flag may be involved and obtained from the respective transform units. For example, in the case of first decoding the sub zone flag, the entropy decoding device can know that all the sub zones included in the second zone z2 are 0 from the set sub zone flag, and can know that one sub zone flag of the first to third sub zones included in the first zone z1 is 1. Accordingly, even if the zone flag information does not exist, or the zone flag information is not decoded, the entropy decoding device can know that the first zone z1 is the last zone including the significant transform coefficient from the sub zone flag. In another embodiment, if a significant group flag for the transform unit is encoded, the zone flag may be involved to be obtained. The significant group flag has a similar concept to the sub zone flag.

Further, in an embodiment, the sub zone flag may be involved and obtained from the corresponding zone and the partially encoded sub zone flag in the corresponding zone. For example, the entropy decoding device may determine that the first zone z1 is set to 1 through decoding of the zone flag. Further, when decoding the first zone z1, the entropy decoding device may decode the sub zone flags in the order of the third sub zone, the first sub zone, and the second sub zone. The entropy decoding device may determine that the value of the zone flag of the third sub zone and the first sub zone is 0. In this case, the entropy decoding device may recognize that the zone flag of the second sub zone is 1 even if the zone flag of the second sub zone is not decoded. The syntax order for the sub zone flag may be changed implicitly or explicitly. If the syntax order is implicitly obtained, the zone index, transform unit size, coding unit size, encoded block type (e.g., intra/inter coding unit), component type (e.g., luma/chroma), and prediction information (e.g., partition mode and prediction mode). The sub zone flag may be obtained from the respective zones or transform units. For example, if the zone flag of the first zone z1 is 1, the syntax order may be in the order of the third sub zone, the second sub zone, and the first sub zone, or in the order of the first sub zone, the second sub zone, and the third sub zone.

As described above, the entropy encoding device may encode the zone flag and the sub zone flag based on the preset context. The context means an information encoding scheme. For example, if the transform unit size is 16 (e.g., 4×4), a context model for encoding the zone flag may be the 0-th model. Further, if the transform unit size is 32 (e.g., 4×8), the context model for encoding the zone flag may be the second model. If the transform unit size is not the above-described size, the context model for encoding the zone flag may be the fourth model. The context model for encoding the sub zone flag may be determined in a similar manner to the above-described process. Since the entropy decoding device has the same information as that of the entropy encoding device, it may decode the received data using the context model used by the entropy encoding device.

Referring to FIG. 21B, zones and sub zones according to a second embodiment are illustrated.

The transform unit may be divided into four sizes of 4, 4, 4, and N−12 on the horizontal axis, and may be divided into four sizes of 4, 4, 4, and N−12 on the vertical axis. Accordingly, the transform unit may include nine blocks having a size of 4×4, three blocks having a size of (N−12)×4, three blocks having a size of 4×(N−12), and one block having a size of (N−12)×(N−12). On the other hand, the transform unit may be successively divided into nine blocks having a size of 4×4, three blocks having a size of (N−12)×4, three blocks having a size of 4×(N−12), and one block having a size of (N−12)×(N−12).

In the transform unit, the zones and the sub zones may be set based on the diagonal direction. The left uppermost end block may be set as the 0-th sub zone. Further, the right block of the left uppermost end block may be set as the first sub zone, and the blocks in the left lower end diagonal direction may be successively set as the sub zones. Further, the zones may be set based on the diagonal direction.

Accordingly, the 0-th zone z0 may be set to include one of the 0-th sub zones. The first zone z1 may include the first sub zone, the second sub zone, the third sub zone, the fourth sub zone, and the fifth sub zone. The second sub zone z2 may include the sixth to $15^{th}$ sub zones.

Referring to FIG. 21C, zones and sub zones according to a third embodiment are illustrated.

The transform unit may be divided into six blocks having a size of 4×4, one block having a size of (N−12)×4, one block having a size of 4×(N−12), one block having a size of (N−8)×4, one block having a size of 4×(N−8), and one block having a size of (N−8)×(N−8).

In the transform unit, the zones and the sub zones may be set based on the diagonal direction. The left uppermost end block may be set as the 0-th sub zone. Further, the right block of the left uppermost end block may be set as the first sub zone, and the blocks in the left lower end diagonal direction may be successively set as the sub zones. Further, the zones may be set based on the diagonal direction.

Accordingly, the 0-th zone z0 may be set to include one of the 0-th sub zones. The first zone z1 may include the first sub zone and the second sub zone. The second sub zone z2 may include the third sub zone, the fourth sub zone, and the fifth sub zone. The third zone z3 may include the sixth to $10^{th}$ sub zones.

Referring to FIGS. 21A to 21C, some embodiments for setting the zones and the sub zones have been described. However, the zones and the sub zones may be set in various schemes.

For example, at least one of the zone division size and the sub zone division size may be variously determined. Further, information on the zone division size and the sub zone division size may be included in a header or a parameter set in a bit stream.

In order to decode an image, information on the image and encoding-related information should be transmitted. Syntax elements to be commonly used in a video sequence or an image unit may be transmitted through a video parameter set (VPS), a sequence parameter set (SPS), and a picture parameter set (PPS). First of all, the SPS is positioned, and the parameters to be commonly used in the video sequence are included. The PPS is a picture header zone including parameter information to be commonly used in the respective images. On the other hand, one picture may be divided into a plurality of slices. A slice header includes parameters of the respective slices.

In an embodiment, size information of the divided zones or divided sub zones may be included in at least one of a slice header, a sequence parameter set (SPS), and a picture parameter set (PPS). In the case of dividing the transform unit into zones and sub zones to be coded, information on the division size of the zones and sub zones is included in the slice header, the SPS, or the PPS, and thus the division size of the zones and sub zones may be variably determined. That is, the division size of the zones and sub zones may be implicitly determined, or may be explicitly determined.

On the other hand, the division of the zones and sub zones may be differently determined according to luma and chroma. In general, a color image may be expressed by a combination of R, G, and B components. However, for efficiency, the color image may be stored and transmitted as YCbCr image that is expressed by Y, Cb, and Cr components. In a YCbCr color space, the luma component and the chroma component are dividedly stored for each pixel. Y denotes the luma component, and Cb and Cr denote chroma components. The RGB space and the YCbCr space may be mutually transformed through a transform equation.

In an embodiment, division of the zones and sub zones may be differently determined according to the luma and the chroma. In the case of the luma, as described above, the zones and sub zones may be divided. However, in the case of the chroma, the zones and sub zones are not divided, and the coefficient coding may be performed using the existing scheme.

The entropy encoding device determines the coefficient coding scheme using the zone flag and the sub zone flag, and encodes the significant transform coefficients using the determined coefficient coding scheme. Further, the entropy decoding device may also decode the encoded significant transform coefficients using the same coefficient coding scheme. A process of determining the coefficient coding scheme and the respective coefficient coding schemes will be described later.

On the other hand, in an embodiment, the coefficient coding may be performed in different schemes according to the luma and the chroma. In the case of the luma, as described above, the coefficient coding scheme may be determined using the zone flag and the sub zone flag. However, in the case of the chroma, the coefficient coding may be performed in the existing HEVC coefficient coding scheme. Since the existing HEVC coefficient coding scheme is a known technology, the explanation thereof will be omitted.

FIGS. 22A and 22B are diagrams explaining an adaptive scanning scheme according to an embodiment of the present invention.

Referring to FIGS. 22A and 22B, a vertical scanning direction and a horizontal scanning direction according to an embodiment are illustrated. In general, the transform unit may be scanned in various directions. The various directions may include a vertical direction, a horizontal direction, and a diagonal direction. The scanning directions may be independent in the respective selected sub zones. The scanning direction may be selected based on various pieces of information. For example, the various pieces of information may include a zone index, a zone flag, a sub zone index, a sub zone flag, the number of sub zones including surrounding significant transform coefficients, an intra mode, a coefficient coding unit (CCU) size, a transform unit size, a coding unit size, presence/absence of transform skip, an encoded block type (e.g., intra/inter coding unit), a component type (e.g., luma/chroma), and prediction information (e.g., partition mode and prediction mode). The coefficient coding unit may be a transform unit, a zone of the transform unit, or a sub zone.

Referring to FIGS. 22A and 22B, a transform unit including three zones and 9 sub zones is illustrated.

The 0-th zone z0 may include the 0-th sub zone, the first zone z1 may include first to third sub zones, and the second zone z2 may include the remaining sub zones. Several variables may be set to determine an adaptive scanning.

For example, if all zone flags of the second, fifth, third, sixth, seventh, and eighth sub zones are 0, it may be determined that cntHor=0, whereas if at least one zone flag of the second, fifth, third, sixth, seventh, and eighth sub zones is 1, it may be determined that cntHor=1. Further, if all zone flags of the first, fourth, third, sixth, seventh, and eighth sub zones are 0, it may be determined that cntVer=0, whereas if at least one zone flag of the first, fourth, third, sixth, seventh, and eighth sub zones is 1, it may be determined that cntVer=1. They may be expressed by the following equations.

$$cntHor = fsz2 + fsz5 + fsz3 + fsz6 + fsz7 + fsz8 \quad (4)$$

$$cntVer = fsz1 + fsz4 + fsz3 + fsz6 + fsz7 + fsz8 \quad (5)$$

Further, several equations using the sub zone flags, cntHor, and cntVer may be further used.

$$isHor4 = fsz0 \& (fsz1 \| fsz4) \& (cntHor==0) \quad (6)$$

$$isVer4 = fsz0 \& (fsz2 \| fsz5) \& (cntVer==0) \quad (7)$$

$$isHor8 = fsz0 \& fsz1 \& (cntHor==0) \quad (8)$$

$$isVer8=fsz0\&fsz2\&(cntVer==0) \quad (9)$$

$$tmpScanIdx=|Imode-VerMode|<5Scan\_Hor:(|Imode-HorMode|<5Scan\_Ver:Scan\_Diag) \quad (10)$$

The equation 10 means that scanning is performed in a horizontal direction if a difference between the intra mode and the vertical mode is within 5, scanning is performed in a vertical direction if the difference between the intra mode and the horizontal mode is within 5, and scanning is performed in a diagonal direction in the remaining case.

The entropy encoding device may determine a scanning mode using the above-described equations. For example, in the case where the sub zone flag of the 0-th sub zone is 0, the entropy encoding device may perform scanning according to tmpScanIdx if the zone flag of the 0-th zone is 0, perform scanning in the horizontal direction if isHor4 is 1, perform scanning in the vertical direction if isVer4 is 1, perform scanning according to tmpScanIdx if the transform block size is 8, and perform scanning in the diagonal direction in the remaining case. Further, in the case where the sub zone flag of the 0-th sub zone is 1, the entropy encoding device may perform scanning according to tmpScanIdx if the sub block size is 8 and tmpScanIdx is not a scanning mode in the diagonal direction, perform scanning in the horizontal direction if the flag of the first sub zone is 1 and isHor8 is 1, perform scanning in the vertical direction if the flag of the second sub zone is 1 and isVer8 is 1, and perform scanning in the diagonal direction in the remaining case. The sub block may be a block obtained by dividing the transform unit by a predetermined size, or a sub zone. The above-described process may be expressed by the following equations.

If $sz0$ $$ScanIdx=fz0?tmpScanIdx:(isHor4?Scan\_Hor: \\ (isVer4?Scan\_Ver:(Tsize==8?tmpScanIdx:Scan\_Diag)))$$

else $$D\ ScanIdx=Tsize==8\&tmpScanIdx!=Scan\_Diag?tmp \\ ScanIdx(sz1\&isHor8?Scan\_Hor: \\ (sz2\&isVer8?ScanVer:Scan\_Diag)) \quad (11)$$

The scanning mode according to equation 11 is regardless of the transform unit size.

Using the above-described equations, the entropy encoding device may perform scanning in the horizontal direction as illustrated in FIG. 22A. For example, if it is assumed that a direction from left to right or a direction from top to bottom is a forward direction, the entropy encoding device may perform scanning in a reverse direction to the horizontal direction as illustrated in FIG. 22A. In another embodiment, the entropy encoding device may perform scanning in a forward direction of the horizontal direction. Further, using the above-described equations, the entropy encoding device may perform scanning in a reverse direction to the vertical direction as illustrated in FIG. 22B. In another embodiment, the entropy encoding device may perform scanning in a forward direction of the vertical direction. The entropy decoding device may perform decoding in the same order as that of the encoding process.

The adaptive scanning scheme as described above with reference to FIGS. 22A and 22B may be used in a specific coefficient coding scheme among plural coefficient coding schemes.

Figure 23A:
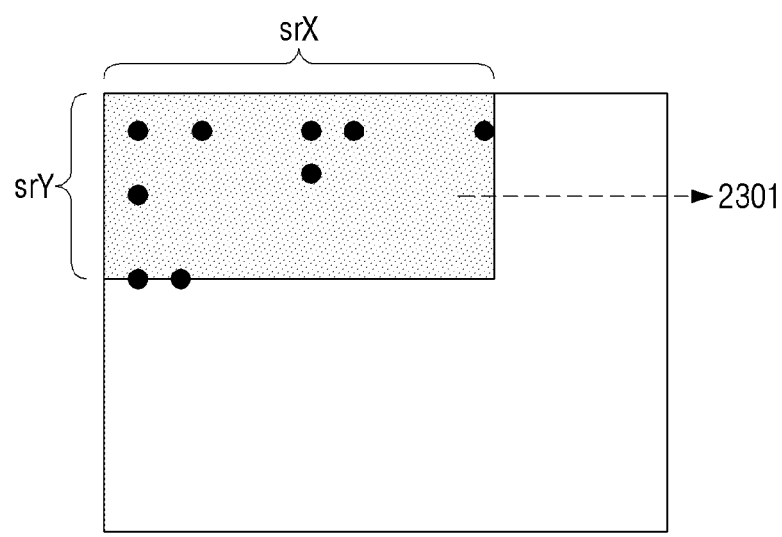
FIGS. 23A and 23B are diagrams explaining an embodiment in which a flexible scanning zone is set.
Figure 23B:
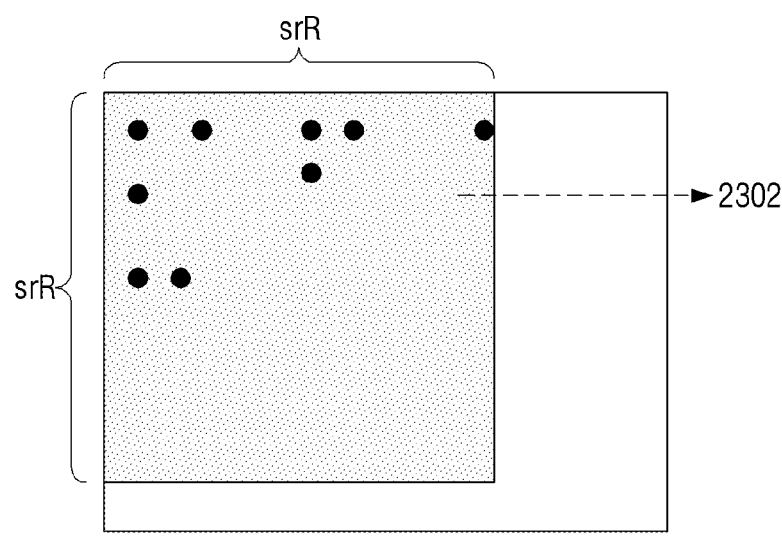

FIGS. 23A and 23B are diagrams explaining an embodiment in which a flexible scanning zone is set.

The entropy encoding device may perform scanning of the coefficient coding unit in various schemes. In an embodiment, the scanning zone may be equal to the coefficient coding unit size. Further, if position information (or last position information) of the last significant transform coefficient is known, the scanning zone may be a partial zone of the coefficient coding unit.

Referring to FIG. 23A, a scanning zone 2301 according to an embodiment is illustrated. The scanning zone 2301 may be defined as (srX, srY), and the scanning order (or direction) in the scanning zone may be calculated. For example, the coefficient coding unit size may be M×N. The srX is the x-coordinate of the rightmost side on which the significant transform coefficient is positioned, and srY is the y-coordinate of the lowermost side on which the significant transform coefficient is positioned. Further, information of (srX, srY) may be encoded and transmitted to the entropy decoding device. In another embodiment, the srX of the scanning zone 2301 may be defined as M−1−(x-coordinate of the rightmost-side significant transform coefficient), and the srY may be defined as N−1−(y-coordinate of the leftmost-side significant transform coefficient).

As a concrete example, the coefficient coding unit size may be 16×8, the x-coordinate of the rightmost side on which the significant transform coefficient is positioned may be 10, and the y-coordinate of the lowermost side on which the significant transform coefficient is positioned may be 5. In this case, the scanning zone 2301 may be defined as (10, 5). Further, the scanning zone 2301 may be defined based on the rightmost side and the lowermost side. That is, the x-coordinate of the scanning zone 2301 may be defined as 16−1−10=5, and the y-coordinate may be defined as 8−1−5=2. That is, the entropy encoding device may set the scanning zone 2301 leftward from the x-coordinate of 5 and upward from the y-coordinate of 2.

Referring to FIG. 23B, a scanning zone 2302 according to another embodiment is illustrated. The scanning zone 2302 may be defined as srR that is a square zone. For example, the coefficient coding unit size may be M×N. If the x-coordinate of the rightmost side on which the significant transform coefficient is positioned is srX, and the y-coordinate of the lowermost side on which the significant transform coefficient is positioned is srY, a larger value between srX and srY may be srR. In still another embodiment, the scanning zone 2302 may be defined as M−1−max (srX, srY) or N−1−max (srX, srY).

Referring to FIG. 23B, only one piece of data is necessary to display coordinate information, and thus the scanning zone can be set with less data. On the other hand, the scanning zone may set 16 zones as one group. The respective zones may be based on the coefficient coding unit, or may be based on the divided transform unit.

Figure 24:
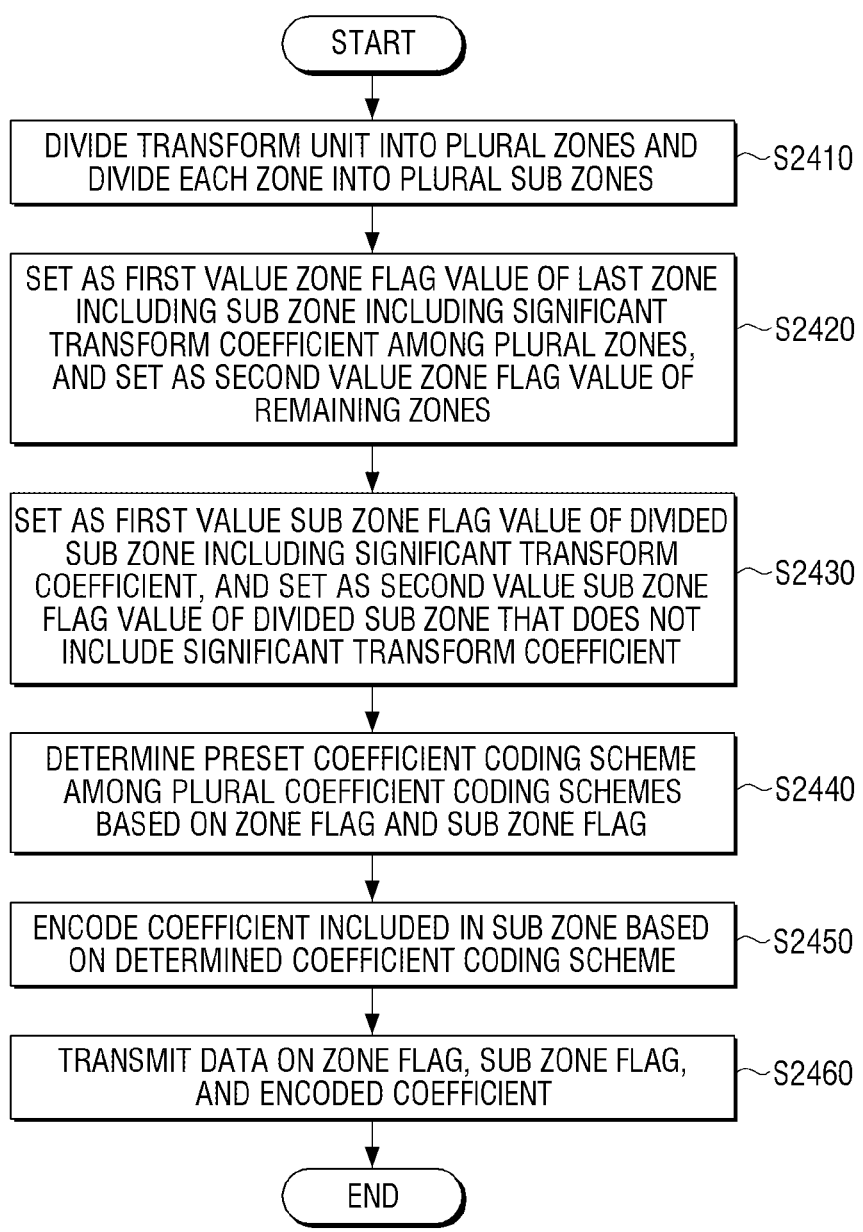
FIG. 24 is a flowchart explaining an entropy encoding method according to an embodiment of the present invention.

FIG. 24 is a flowchart explaining an entropy encoding method according to an embodiment of the present invention.

Referring to FIG. 24, the entropy encoding device divides a transform unit into a plurality of zones, and divides each of the plurality of zones into sub zones (S2410). The sub zone may be divided with various sizes. Further, the zone may be divided in various types. For example, the transform unit may be divided into sub zones, and partial sub zones may be classified into one zone. Further, the transform unit may be divided into zones, and sub zones are divided in the zone.

The entropy decoding device sets a zone flag value with respect to the last zone which includes the sub zone including the significant transform coefficient among the plurality of zones (S2420). Further, if the divided sub zone includes the significant transform coefficient, the entropy encoding device sets a sub zone flag value with respect to each of the divided sub zones (S2430). Setting of the flag value may mean setting of the flag value to a specific value or changing of the existing value. For example, the flag value may be set to 1. The sub zone flag value of 1 means that the significant transform coefficient is included in the sub zone. Further, the zone flag value of 1 means the last zone in which the significant transform coefficient is included. The entropy encoding device may first set the sub zone flag value, and then may set the zone flag value.

Further, the entropy encoding device may involve a flag for one zone or one sub zone to be extracted without clearly setting the zone flag and sub zone flag values. For example, if the zone flag value up to the (n−1)-th zone among the n zones is not set, the entropy encoding device may omit setting of the zone flag value of the n-th zone. At least one significant transform coefficient may exist in a frame, and if the significant transform coefficient does not exist up to the zone that is just before the last zone, the significant transform coefficient may exist in the last zone. Further, in the case where m sub zones exist in the zone in which the zone flag is set, the entropy encoding device may not set the sub zone flag value of the m-th sub zone if the sub zone flag value up to the (m−1)-th sub zone is not set. In the zone in which the zone flag is set, the significant transform coefficient exists. However, if the significant transform coefficient does not exist up to the (m−1)-th sub zone, the significant transform coefficient may exist in the last sub zone.

The entropy encoding device determines the preset coefficient coding scheme based on the zone flag and the sub zone flag (S2440). In an embodiment, it is assumed that the transform unit is divided in the form as illustrated in FIG. 21A. If the flag of the 0-th zone z0 is 1 or the sum of the flags of the first to third sub zones is equal to or smaller than 1, the 0-th sub zone included in the 0-th zone z0 may be encoded in the first coefficient coding scheme A (CCsA). If the above-described condition is not satisfied, the 0-th sub zone may be encoded in the second coefficient coding scheme B (CCsB).

If the flag of the first zone z1 is 1, the first to third sub zones included in the first zone z1 may be encoded in the third coefficient coding scheme C (CCsC). If the above-described condition is not satisfied, the first to third sub zones may be encoded in the first coefficient coding scheme A (CCsA).

The remaining sub zones may be encoded in the third coefficient coding scheme C (CCsC). The detailed coefficient coding schemes will be described later.

The entropy encoding device encodes the coefficients included in the transform unit based on the determined coefficient coding scheme (S2450). The encoding may be performed in the unit of respective sub zones. Various coefficient coding schemes may be determined according to conditions of the zone flag and the sub zone flag. Further, the entropy encoding device may use various context models according to the detailed conditions even if it uses the same coefficient coding scheme.

The entropy encoding device transmits data on the zone flag, the sub zone flag, and the encoded coefficient (S2460).

Figure 25:
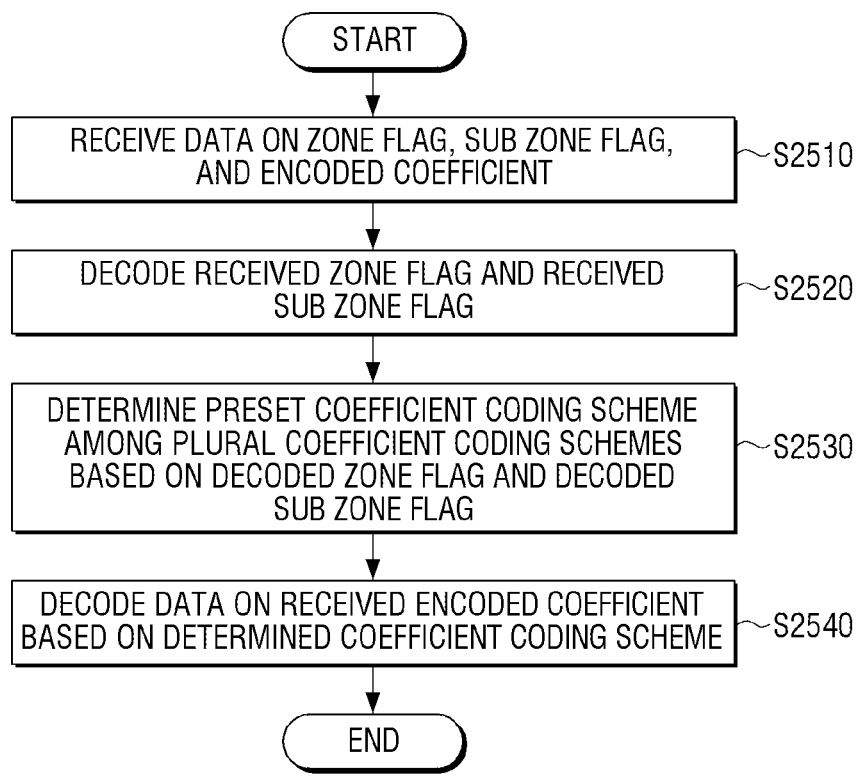
FIG. 25 is a flowchart explaining an entropy decoding method according to an embodiment of the present invention.

FIG. 25 is a flowchart explaining an entropy decoding method according to an embodiment of the present invention.

Referring to FIG. 25, the entropy decoding device receives data on the zone flag, the sub zone flag, and the encoded coefficient (S2510). The zone flag, the sub zone flag, and the encoded coefficient may be received as a bit stream.

The entropy decoding device decodes the received zone flag and the received sub zone flag (S2520). The entropy decoding device may first decode the zone flag, and then decode the sub zone flag. Further, the entropy decoding device may first decode the sub zone flag, and then decode the zone flag. Further, as described above, the flag of the last zone or the last sub zone in one zone may be extracted based on the previous information.

In an embodiment, the zone flag and the sub zone flag may be decoded in the following order. It is assumed that the transform unit is divided in the form as illustrated in FIG. 21A. If the sub block size is larger than 4×4, the entropy decoding device may decode the flag of the 0-th zone z0. Further, if the flag of the 0-th zone z0 is not 0, the entropy decoding device may decode the flag of the first zone z1. If the first zone flag z1 is not 0, the entropy decoding device may determine that the flag of the second zone z2 is 1.

If the flag of the 0-th zone z0 is 1, the entropy decoding device may determine the flag of the 0-th sub zone is 1. If the flag of the 0-th zone z0 is not 1, but the flag of the first zone z1 is 1, the entropy decoding device may decode the flags of the 0-th sub zone, the third sub zone, the second sub zone, and the first sub zone. Further, the entropy decoding device may decode the flags of the 0-th sub zone, the third sub zone, and the second sub zone, and may decode the flag of the first sub zone only in the case where the flag of at least one of the third sub zone and the second sub zone is 1. If the flags of the third sub zone and the second sub zone are all 0, the entropy encoding device may determine that the flag of the first sub zone is 1 without decoding the same. If the flags of the 0-th zone z0 and the first zone z1 are all 0, the entropy decoding device may decode the flags of all the sub zones. Further, the entropy decoding device may decode the sub zones included in the 0-th zone z0 and the first zone z1. Further, the entropy decoding device may decode the flag of the fourth sub zone only in the case where at least one of the fifth to eighth sub zones is 1.

The entropy decoding device determines the preset coefficient coding scheme based on the decoded zone flag and the decoded sub zone flag (S2530). The preset coefficient coding scheme may be the same as the scheme of the corresponding encoding device, and information on the coefficient coding scheme may be pre-stored. Further, information on the coefficient coding scheme may be transmitted together with the transmitted data. The entropy decoding device may perform the decoding only with respect to the sub zone in which the flag is set.

In an embodiment, if the flag of the 0-th zone z0 is 1 or the sum of the flags of the first to third sub zones is equal to or smaller than 1, the 0-th sub zone included in the 0-th zone z0 may be decoded in the first coefficient coding scheme A (CCsA). If the above-described condition is not satisfied, the 0-th sub zone may be decoded in the second coefficient coding scheme B (CCsB).

If the flag of the first zone z1 is 1, the first to third sub zones included in the first zone z1 may be decoded in the third coefficient coding scheme C (CCsC). If the above-described condition is not satisfied, the first to third sub zones may be encoded in the first coefficient coding scheme A (CCsA).

The remaining sub zones may be encoded in the third coefficient coding scheme C (CCsC). The detailed coefficient coding schemes will be described later.

The entropy decoding device decodes data on the received encoded coefficient based on the determined coefficient coding scheme (S2540). The zone flag indicates the last zone in which the sub zone including the significant transform coefficient is included among the plurality of zones into which the transform unit is divided, and the sub zone flag indicates the sub zone including the significant transform coefficient among the sub regions into which the plurality of zones are respectively divided.

Hereinafter, a detailed coefficient coding scheme will be described.

Figure 26:
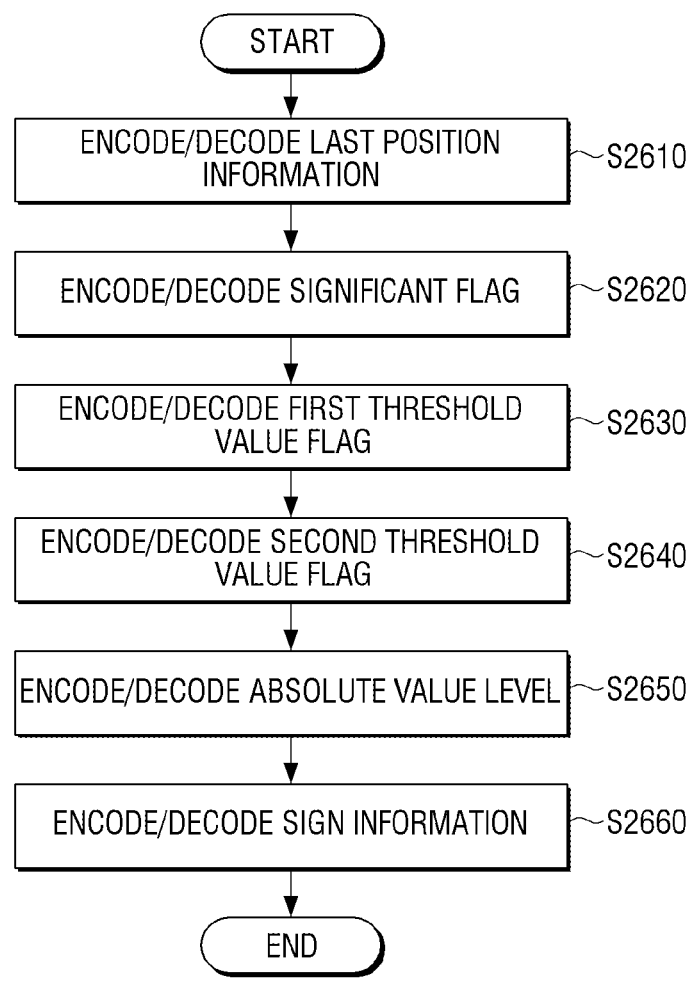
FIG. 26 is a flowchart explaining an entropy encoding and decoding process based on a first coefficient coding scheme according to an embodiment of the present invention.

FIG. 26 is a flowchart explaining an entropy encoding and decoding process based on a first coefficient coding scheme according to an embodiment of the present invention.

Referring to FIG. 26, the first coefficient coding scheme may include a process of encoding (or decoding) the last position information (S2610). The last position means the last position in which the significant transform coefficient based on the scanning order exists. That is, the last position information means position information of the last significant transform coefficient. For example, the coefficient coding unit may be M×N, and the last position may be (lastX, lastY). The coefficient coding unit may be the sub zone. Accordingly, the last position information may be included in each sub zone.

The last position information may be (lastX, lastY) that is set in a forward direction. Further, the last position information may be set in a reverse direction with respect to at least one coordinate. That is, the last position information may be (M−1−lastX, lastY), (lastX, N−1−lastY), and (M−1−lastX, N−1−lastY). The direction in which the last position information is set may be determined based on the zone index, the zone flag, the sub zone index, or the sub zone flag. In an embodiment, if the scanning order is in the vertical direction, lastX and lastY may be swapped. For example, a context for encoding the last position information may be determined based on a zone index, a zone flag, a sub zone index, a sub zone flag, a coefficient coding unit size, a setting direction of the last position information, whether to skip the transform, an encoded block type (e.g., intra/inter coding unit), a component type (e.g., luma/chroma), and prediction information (e.g., partition mode and prediction mode).

The first coefficient coding scheme may include a process of encoding a significant flag (SigFlag) (S2620). The significant flag may be a flag indicating whether the coefficient of each pixel is a significant transform coefficient. The significant flag of the last significant transform coefficient may not be encoded. For example, the context for encoding the significant flag may be determined based on a coefficient coding unit position, an encoded surrounding significant flag, a zone index, a zone flag, a sub zone index, a sub zone flag, a coefficient coding unit size, a transform unit size, a coding unit size, a scanning order, whether to skip the transform, an encoded block type (e.g., intra/inter coding unit), a type of a coefficient coding scheme, a component type (e.g., luma/chroma), and prediction information (e.g., partition mode and prediction mode).

The first coefficient coding scheme may include a process of encoding the first threshold flag (GT1 flag) (S2630). The number of first threshold flags may be limited to a preset number. For example, the context for encoding the first threshold value flag may be determined based on the number of 1 trailed in the reverse scanning order, the number of first threshold value flags in the surrounding sub zones, the number of surrounding significant flags, the number of surrounding significant first threshold value flags, a zone index, a zone flag, a sub zone index, a sub zone flag, a coefficient coding unit size, a transform unit size, a coding unit size, a setting direction of the last position information, whether to skip the transform, an encoded block type (e.g., intra/inter coding unit), a type of a coefficient coding scheme, a component type (e.g., luma/chroma), and prediction information (e.g., partition mode and prediction mode).

The first coefficient coding scheme may include a process of encoding the second threshold flag (GT2 flag) (S2640). The number of second threshold flags may be limited to a preset number. For example, a context for encoding the second threshold value flag may be determined based on the number of surrounding significant flags in the reverse scanning order, the number of significant first threshold value flags in the surrounding sub zones, a zone index, a zone flag, a sub zone index, a sub zone flag, a coefficient coding unit size, a transform unit size, a coding unit size, a setting direction of the last position information, whether to skip the transform, an encoded block type (e.g., intra/inter coding unit), a type of a coefficient coding scheme, a component type (e.g., luma/chroma), and prediction information (e.g., partition mode and prediction mode).

The first coefficient coding scheme may include a process of encoding an absolute value level (S2650). A level coding process may be performed after encoding of the first and second threshold value flags. In an embodiment, if the first threshold value flag is significant and the second threshold value flag is not signaled, an absolute value level encoding of level-2 may be performed. If the first threshold value flag and the second threshold value flag are significant, an absolute value level encoding of level-3 may be performed.

The first coefficient coding scheme may include a process of encoding sign information (S2660). Since a process using an absolute value of the coefficient is performed, a process of encoding information indicating a negative number may be performed. In an embodiment, the sign information may be encoded in a fixed length coding scheme.

A decoding process may be performed in the same order as the order of the encoding process.

Figure 27:
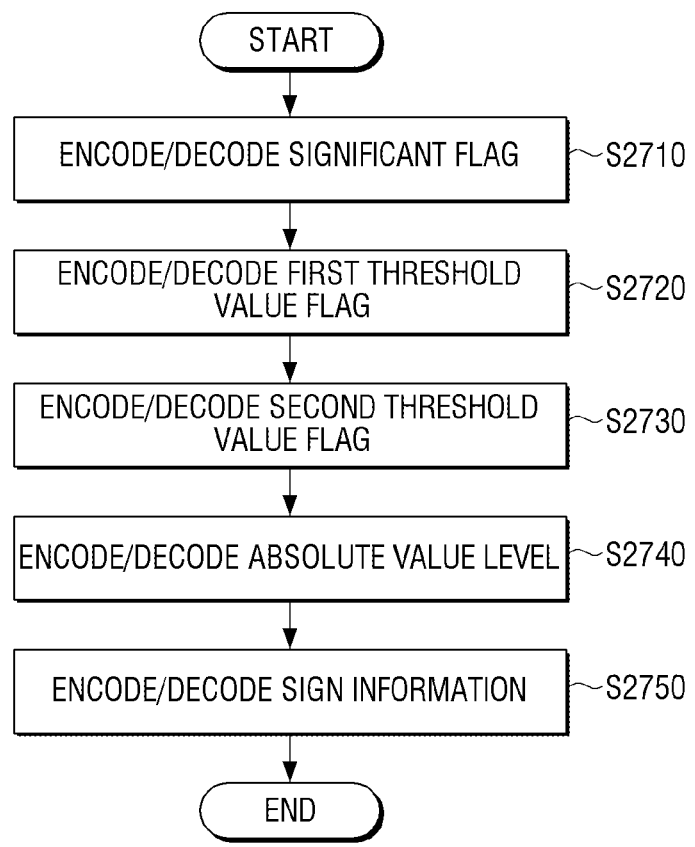
FIG. 27 is a flowchart explaining an entropy encoding and decoding process based on a second coefficient coding scheme according to an embodiment of the present invention.

FIG. 27 is a flowchart explaining an entropy encoding and decoding process based on a second coefficient coding scheme according to an embodiment of the present invention.

Referring to FIG. 27, the second coefficient coding scheme may include a process of encoding (or decoding) a significant flag (S2710). The significant flag of the last significant transform coefficient may not be encoded. If the previous M×N−1 coefficients are all 0 when the coefficient coding unit is M×N, the significant flag of the last significant transform coefficient may be analogized as 1.

For example, the context for encoding the significant flag may be determined based on a coefficient coding unit position, an encoded surrounding significant flag, a zone index, a zone flag, a sub zone index, a sub zone flag, a coefficient coding unit size, a transform unit size, a coding unit size, a scanning order, whether to skip the transform, an encoded block type (e.g., intra/inter coding unit), a type of a coefficient coding scheme, a component type (e.g., luma/chroma), and prediction information (e.g., partition mode and prediction mode).

The second coefficient coding scheme may include a process of encoding the first threshold flag (S2720). The number of first threshold flags may be limited to a preset number. For example, the context for encoding the first threshold value flag may be determined based on the number of 1 trailed in the reverse scanning order, the number of first threshold value flags in the surrounding sub zones, the number of surrounding significant flags, the number of surrounding significant first threshold value flags, a zone index, a zone flag, a sub zone index, a sub zone flag, a coefficient coding unit size, a transform unit size, a coding unit size, a setting direction of the last position information, whether to skip the transform, an encoded block type (e.g., intra/inter coding unit), a type of a coefficient coding scheme, a component type (e.g., luma/chroma), and prediction information (e.g., partition mode and prediction mode).

The second coefficient coding scheme may include a process of encoding the second threshold flag (S2730). The number of second threshold flags may be limited to a preset number. For example, the context for encoding the second threshold value flag may be determined based on the number of surrounding significant flags in the reverse scanning order, the number of significant first threshold value flags, the number of first threshold value flags in the surrounding sub zones, a zone index, a zone flag, a sub zone index, a sub zone flag, a coefficient coding unit size, a transform unit size, a coding unit size, a setting direction of the last position information, whether to skip the transform, an encoded block type (e.g., intra/inter coding unit), a type of a coefficient coding scheme, a component type (e.g., luma/chroma), and prediction information (e.g., partition mode and prediction mode).

The second coefficient coding scheme may include a process of encoding an absolute value level (S2740). A level coding process may be performed after encoding of the first and second threshold value flags. In an embodiment, if the first threshold value flag is significant and the second threshold value flag is not signaled, an absolute value level encoding of level-2 may be performed. If the first threshold value flag and the second threshold value flag are significant, an absolute value level encoding of level-3 may be performed.

The second coefficient coding scheme may include a process of encoding sign information (S2750). Since a process using an absolute value of the coefficient is performed, a process of encoding information indicating a negative number may be performed. In an embodiment, the sign information may be encoded in a fixed length coding scheme.

Figure 28:
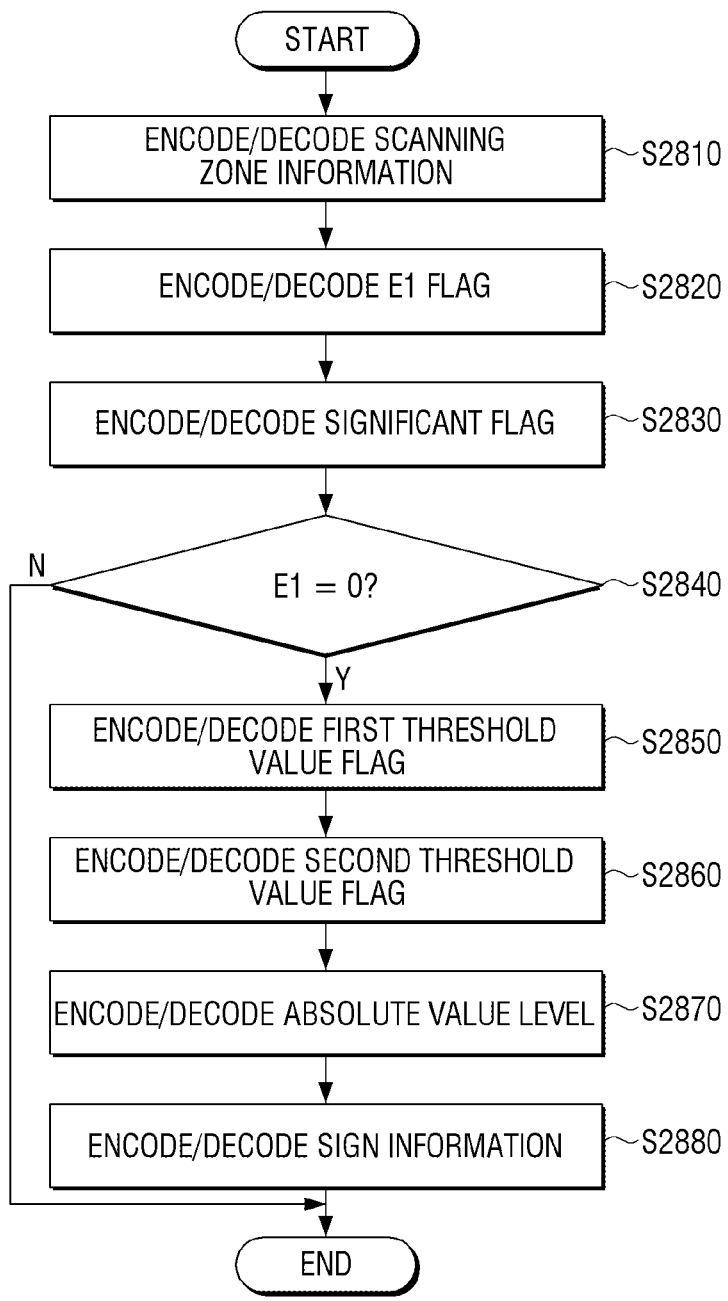
FIG. 28 is a flowchart explaining an entropy encoding and decoding process based on a third coefficient coding scheme according to an embodiment of the present invention.

FIG. 28 is a flowchart explaining an entropy encoding and decoding process based on a third coefficient coding scheme according to an embodiment of the present invention.

Referring to FIG. 28, the third coefficient coding scheme may include a process of encoding (or decoding) information of a scanning zone (S2810). The scanning zone has been described with reference to FIGS. 23A and 23B. Information on the scanning region may be indicated by forward coordinate information set based on the left upper end of the transform unit or backward coordinate information set based on the right lower end of the transform unit. For example, a context for encoding the scanning zone information may be determined based on a zone index, a zone flag, a sub zone index, a sub zone flag, a coefficient coding unit size, a transform unit size, a coding unit size, forward or backward direction, whether to skip the transform, an encoded block type (e.g., intra/inter coding unit), a component type (e.g., luma/chroma), and prediction information (e.g., partition mode and prediction mode).

The third coefficient coding scheme may include a process of encoding an E1 flag (S2820). The E1 flag is a flag indicating that all transform coefficients of the corresponding block (e.g., sub zone, coefficient coding unit, and divided blocks of the transform unit) are 1. The E1 flag may not be set with respect to all blocks. That is, a block in which the E1 flag is not set may be considered as 0. For example, the condition for transmitting the E1 flag may be determined based on a zone index, a zone flag, a sub zone index, a sub zone flag, and the number of first threshold value flags in the pre-encoded sub zone. Further, the context for encoding the E1 flag may be determined based on a zone index, a zone flag, a sub zone index, a sub zone flag, the number of first threshold value flags in the pre-encoded sub zone, a coefficient coding unit size, a transform unit size, a coding unit size, a setting direction of the last position information, whether to skip the transform, an encoded block type (e.g., intra/inter coding unit), a type of a coefficient coding scheme, a component type (e.g., luma/chroma), and prediction information (e.g., partition mode and prediction mode).

The third coefficient coding scheme may include a process of encoding the significant flag (S2830). Since the process of encoding the significant flag has been described, the duplicate explanation thereof will be omitted.

The third coefficient coding scheme may include a process of determining whether the E1 flag is 0 (S2840). If the E1 flag is 0, the third coefficient coding scheme may include a process of encoding the first threshold value flag (S2850). The third coefficient coding scheme may include a process of encoding the second threshold value flag (S2860). The third coefficient coding scheme may include a process of encoding an absolute value level (S2870). The third coefficient coding scheme may include a process of encoding sign information (S2880). Since the process of encoding the first and second threshold value flags, the absolute value level, and the sign information has been described, the duplicate explanation thereof will be omitted.

The third coefficient coding scheme includes a process of defining and transmitting a scanning zone, and is a new scheme including a new process that is not disclosed in the related art.

Figure 29:
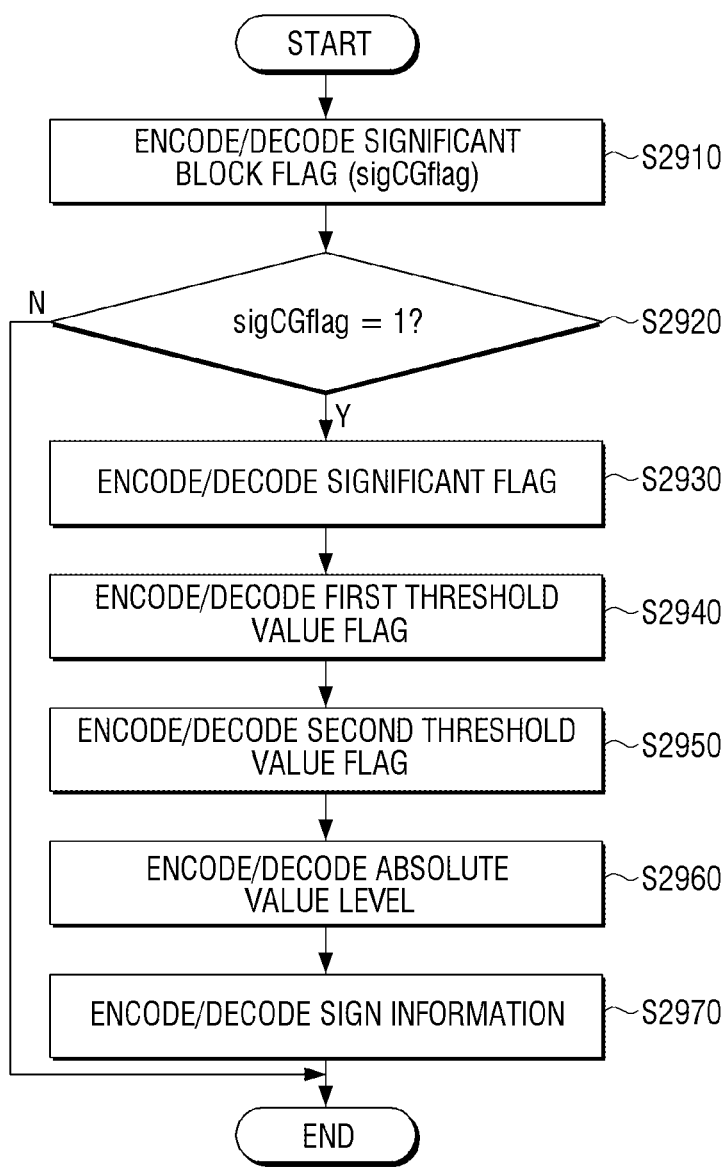
FIG. 29 is a flowchart explaining an entropy encoding and decoding process based on a fourth coefficient coding scheme according to an embodiment of the present invention.

FIG. 29 is a flowchart explaining an entropy encoding and decoding process based on a fourth coefficient coding scheme according to an embodiment of the present invention.

Referring to FIG. 29, the fourth coefficient coding scheme may include a process of encoding (or decoding) a significant block flag (SigCGflag) (S2910). In an embodiment, the coefficient coding unit may be M×N. The coefficient coding unit may include a plurality of coefficient groups. The coefficient group may be a block having a certain size, or may include a predetermined number of coefficients. The significant block flag may be a flag indicating whether the significant transform coefficient is included in the sub block.

The fourth coefficient coding scheme may include a process of determining whether the significant block flag is 1 (S2920). If the significant block flag is 1, the fourth coefficient coding scheme may include a process of encoding the significant flag (S2930). The fourth coefficient coding scheme may include a process of encoding the first threshold value flag (S2940). The fourth coefficient coding scheme may include a process of encoding the second threshold value flag (S2950). The fourth coefficient coding scheme may include a process of encoding an absolute value level (S2960). The fourth coefficient coding scheme may include a process of encoding sign information (S2970). Since the respective processes are the same as the above-described processes, the duplicate explanation thereof will be omitted.

Figure 30:
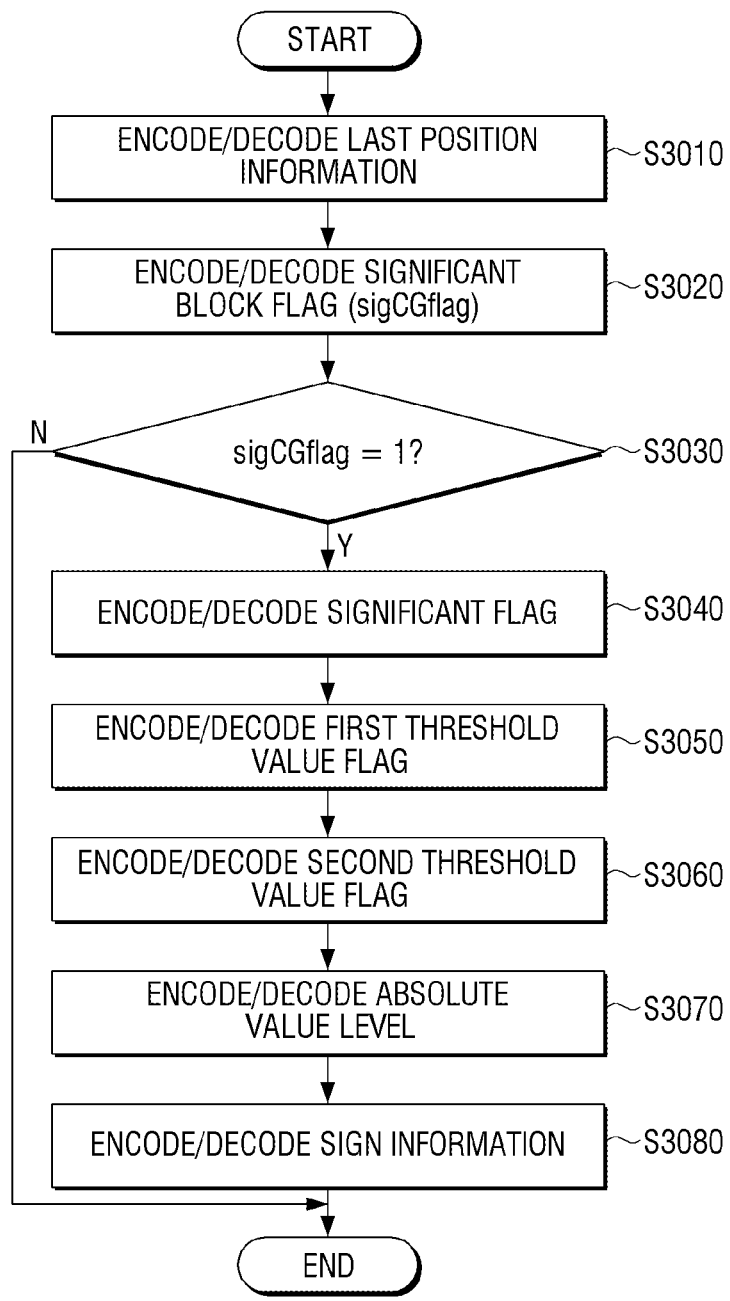
FIG. 30 is a flowchart explaining an entropy encoding and decoding process based on a fifth coefficient coding scheme according to an embodiment of the present invention.

FIG. 30 is a flowchart explaining an entropy encoding and decoding process based on a fifth coefficient coding scheme according to an embodiment of the present invention.

Referring to FIG. 30, the fifth coefficient coding scheme may include a process of encoding (or decoding) the last position information (S3010). The fifth coefficient coding scheme may include a process of encoding a significant block flag (SigCGflag) (S3020). The fifth coefficient coding scheme may include a process of determining whether the significant block flag is 1 (S3030). If the significant block flag is 1, the fifth coefficient coding scheme may include a process of encoding a significant flag (S3040). The fifth coefficient coding scheme may include a process of encoding the first threshold value flag (S3050). The fifth coefficient coding scheme may include a process of encoding the second threshold value flag (S3060). The fifth coefficient coding scheme may include a process of encoding an absolute value level (S3070). The fifth coefficient coding scheme may include a process of encoding sign information (S3080). Since the respective processes are the same as the above-described processes, the duplicate explanation thereof will be omitted.

Figure 31:
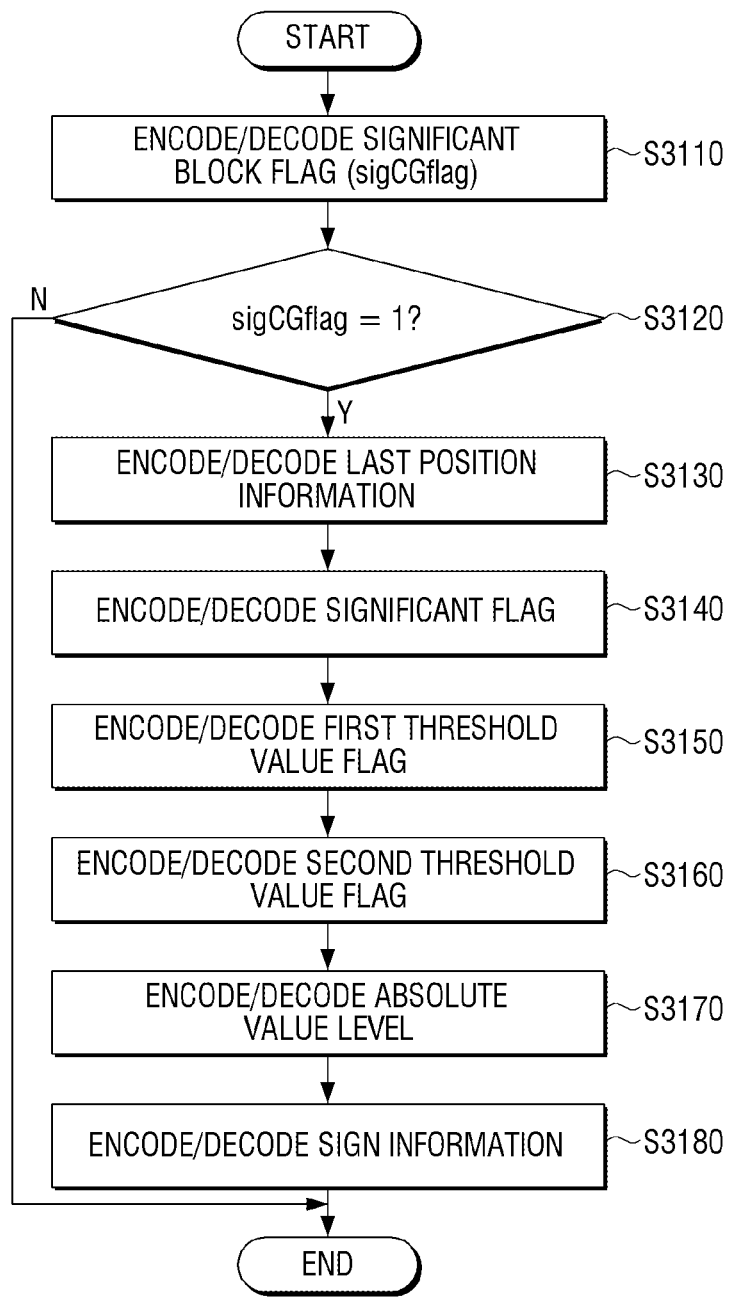
FIG. 31 is a flowchart explaining an entropy encoding and decoding process based on a sixth coefficient coding scheme according to an embodiment of the present invention.

FIG. 31 is a flowchart explaining an entropy encoding and decoding process based on a sixth coefficient coding scheme according to an embodiment of the present invention.

Referring to FIG. 31, the sixth coefficient coding scheme may include a process of encoding (or decoding) a significant block flag (SigCGflag) (S3110). The sixth coefficient coding scheme may include a process of determining whether the significant block flag is 1 (S3120). If the significant block flag is 1, the sixth coefficient coding scheme may include a process of encoding the last position information (S3130). The sixth coefficient coding scheme may include a process of encoding a significant flag (S3140). The sixth coefficient coding scheme may include a process of encoding the first threshold value flag (S3150). The sixth coefficient coding scheme may include a process of encoding the second threshold value flag (S3160). The sixth coefficient coding scheme may include a process of encoding an absolute value level (S3170). The sixth coefficient coding scheme may include a process of encoding sign information (S3180). Since the respective processes are the same as the above-described processes, the duplicate explanation thereof will be omitted.

Figure 32:
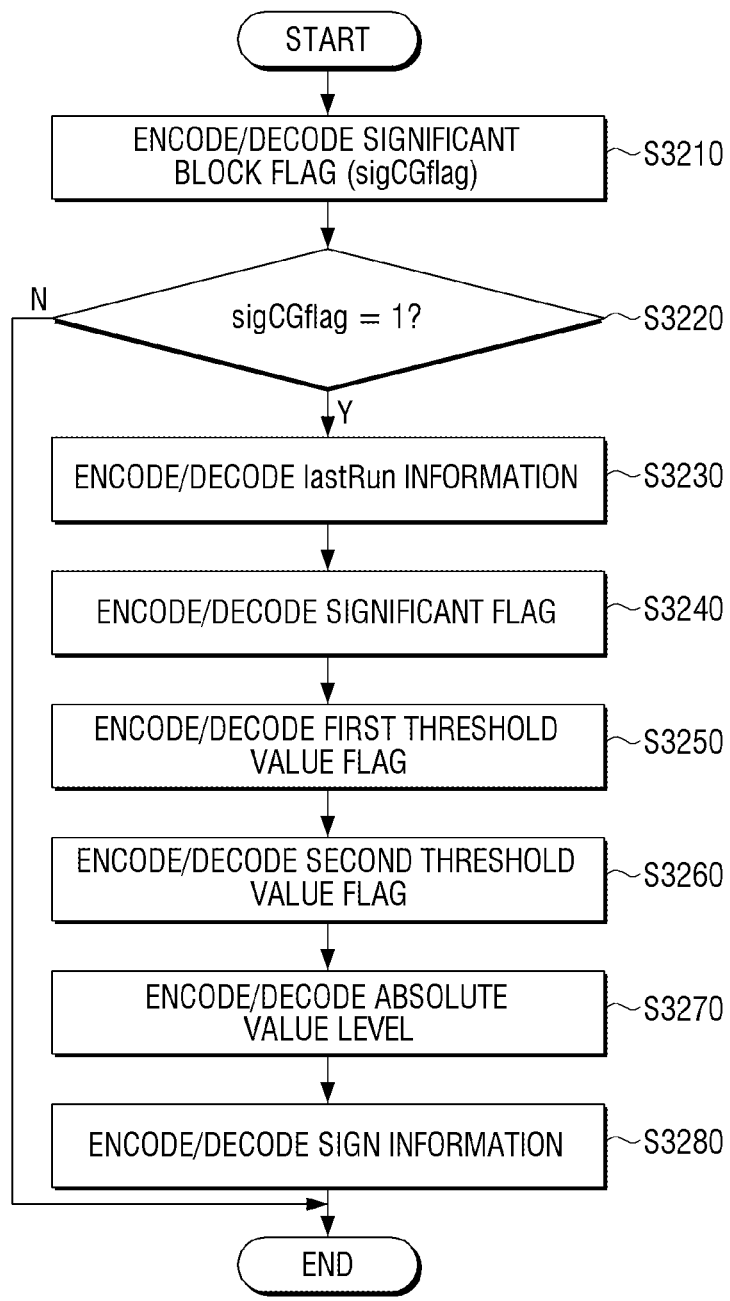
FIG. 32 is a flowchart explaining an entropy encoding and decoding process based on a seventh coefficient coding scheme according to an embodiment of the present invention.

FIG. 32 is a flowchart explaining an entropy encoding and decoding process based on a seventh coefficient coding scheme according to an embodiment of the present invention.

Referring to FIG. 32, the seventh coefficient coding scheme may include a process of encoding (or decoding) a significant block flag (SigCGflag) (S3210). The seventh coefficient coding scheme may include a process of determining whether the significant block flag is 1 (S3220).

If the significant block flag is 1, the seventh coefficient coding scheme may include a process of encoding lastRun information (S3230). The lastRun information may be the last significant transform coefficient position information on the scanning order.

For example, the coefficient coding unit may be 4×4. The scanning may be performed in a forward direction. That is the scanning may be performed in the order from left to right and in the order from top to bottom. The scanning may be performed in the order of the first position on the left side of the first row, the second position, the third position, and the fourth position. Further, if the scanning of the first row is ended, the scanning may be performed from the first position on the left side of the second row to the fourth position direction. If the second position on the third row is the last significant transform coefficient position, the lastRun may be 10. Further, the scanning may be performed in a reverse direction. That is, the scanning may be performed in the order of the fourth position on the fourth row, the third position, the second position, and the first position. Further, if the scanning of the fourth row is ended, the scanning may be performed from the fourth position on the right side of the third row to the first position direction. If the second position of the third row is the position of the last significant transform coefficient position, the lastRun may be 7. The direction for setting the lastRun may be determined based on a zone index, a zone flag, a sub zone index, and a sub zone flag. For example, the context for encoding the lastRun may be determined based on a zone index, a zone flag, a sub zone index, a sub zone flag, a coefficient coding unit size, a transform unit size, a coding unit size, forward or backward direction, whether to skip the transform, an encoded block type (e.g., intra/inter coding unit), a component type (e.g., luma/chroma), and prediction information (e.g., partition mode and prediction mode).

The seventh coefficient coding scheme may include a process of encoding the significant flag (S3240). The seventh coefficient coding scheme may include a process of encoding the first threshold value flag (S3250). The seventh coefficient coding scheme may include a process of encoding the second threshold value flag (S3260). The seventh coefficient coding scheme may include a process of encoding an absolute value level (S3270). The seventh coefficient coding scheme may include a process of encoding sign information (S3280). Since the respective processes are the same as the above-described processes, the duplicate explanation thereof will be omitted.

FIG. 33 is a diagram explaining an embodiment in which a context model for coding the last coefficient position is determined.

The entropy encoding device may acquire a context set index and an offset indicating one of a plurality of context sets. Further, the entropy encoding device may determine a context index ctdIdx indicating a context model to be applied based on the contest set index and the offset.

Referring to FIG. 33, Zflag may mean s zone flag. Further, Inverse may mean whether the scanning direction is a forward direction or a backward direction. Further, 16×16 may be the size of a sub block. The sub block may be a sub zone, a coefficient coding unit, or a divided block of the transform unit. A context model for encoding the last coefficient position corresponding to the respective conditions may be determined.

FIG. 34 is a diagram explaining an embodiment in which a context model for coding a scanning zone is determined.

Referring to FIG. 34, Inverse may mean whether the scanning direction is a forward direction or a backward direction. Further, 16×16 may be the size of a sub block. A context model for encoding the scanning zone corresponding to the respective conditions may be determined.

FIG. 35 is a diagram explaining an embodiment in which a context model for coding a significant flag is determined, and FIG. 36 is a diagram explaining an embodiment in which a context model for level coding is determined.

In a similar manner to that as described above, a context model corresponding to the respective conditions for encoding the significant flag or a context model corresponding to the respective condition for level encoding may be determined.

The method for entropy encoding and decoding according to various embodiments as described above may be implemented by a program, and a non-transitory computer readable medium may be provided to store therein the program.

A non-transitory computer readable medium is not a medium that stores data for a short period, such as a register, a cache, or a memory, but means a medium which semipermanently stores data and is readable by a device. Specifically, the above-described programs may be stored and provided in the non-transitory computer readable medium, such as, a CD, a DVD, a hard disc, a Blu-ray disc, a USB, a memory card, and a ROM.

While the invention has been shown and described with reference to certain embodiments thereof, it will be understood by those skilled in the art that various changes in form and detail may be made therein without departing from the spirit and scope of the present invention, as defined by the appended claims.

The invention claimed is:

1. An entropy encoding method comprising:
dividing a transform unit into a plurality of zones, and dividing each of the plurality of zones into sub zones;
identifying a last zone, in which a sub zone including a significant transform coefficient, which is not 0, is included, among the plurality of zones based on a scanning order;
setting, as a first value, a value of a zone flag of the last zone, and setting, as a second value, a value of a zone flag of remaining zones;
setting, as the first value, a value of a sub zone flag of the sub zone having the significant transform coefficient, and setting, as the second value, a value of a sub zone flag of sub zones that do not include the significant transform coefficient;
determining a preset coefficient coding scheme of each of the plurality of zones among a plurality of coefficient coding schemes based on at least one of a part of a plurality of zone flags and a part of a plurality of sub zone flags;
encoding a coefficient included in each of a plurality of sub zones based on the determined preset coefficient coding scheme corresponding to a zone including the each of the plurality of sub zones; and
transmitting data on the plurality of zone flags, the plurality of sub zone flags, and the encoded coefficient included in the each of the plurality of sub zones.

2. The entropy encoding method as claimed in claim 1, wherein the setting the value of the zone flag includes omitting setting of the value of the zone flag of an n-th zone if the value of the zone flag up to an (n−1)-th zone among n zones is not set as the first value, and
the setting the value of the sub zone flag includes omitting setting of the value of the sub zone flag of an m-th sub zone if the value of the sub zone flag up to an (m−1)-th sub zone is not set as the first value based on a predetermined direction in the case where the zone in which the value of the zone flag is set includes the sub zones.

3. The entropy encoding method as claimed in claim 1, wherein the determining the preset coefficient coding scheme comprises:
determining a first coefficient coding scheme for encoding a first zone among the plurality of zones if a first condition is satisfied, in which the value of the zone flag of the first zone is set to the first value, or the value of the sub zone flag for one or less of the plurality of sub zones included in a second zone is set to the first value in a state where the value of the zone flag of the first zone is not set to the first value;
determining a second coefficient coding scheme for encoding the first zone if the first condition is not satisfied;
determining a third coefficient coding scheme for encoding the second zone if a second condition is satisfied, in which the value of the zone flag of the second zone among the plurality of zones is set to the first value; and
determining the first coefficient coding scheme for encoding the second zone and determining the third coefficient coding scheme for encoding remaining zones among the plurality of zones if the second condition is not satisfied.

4. The entropy encoding method as claimed in claim 3, wherein at least one of the plurality of coefficient coding schemes includes information on a scanning zone of the significant transform coefficient in the sub zone.

5. An entropy decoding method comprising:
receiving data on a plurality of zone flags, a plurality of sub zone flags, and an encoded coefficient included in each of a plurality of sub zones;
obtaining the plurality of zone flags, the plurality of sub zone flags, and the encoded coefficient included in the each of the plurality of sub zones by decoding the received data;
determining a preset coefficient coding scheme of each of a plurality of zones among a plurality of coefficient coding schemes based on at least one of a part of the plurality of zone flags and a part of the plurality of sub zone flags; and
decoding data on the encoded coefficient included in the each of the plurality of sub zones based on the determined preset coefficient coding scheme corresponding to a zone including the each of the plurality of sub zones,
wherein the zone flag is set to a first value with respect to a last zone, which is identified based on a scanning order, which includes a sub zone including a significant transform coefficient, which is not 0, among a plurality of zones into which a transform unit is divided, and is set to a second value with respect to remaining zones, and a sub zone flag is set to the first value with respect to a sub zone including the significant transform coefficient among the plurality of sub zones, and is set to the second value with respect to a sub zones that do not include the significant transform coefficient among the plurality of sub zones.

6. The entropy decoding method as claimed in claim 5, wherein the decoding the zone flag comprises:
determining that a value of the zone flag of an n-th zone is set to the first value if a value of the zone flag up to an (n−1)-th zone among n zones is not set to the first value; and
determining that a value of the zone flag of an m-th zone is set to the first value if the zone includes m sub zones, and a value of the sub zone flag up to an (m−1)-th sub zone is not set to the first value based on a predetermined direction.

7. The entropy decoding method as claimed in claim 5, wherein the sub zone is scanned in various modes for each of the sub zones based on at least one of a number of the surrounding sub zones including zone indexes, zone flags, sub zone indexes, sub zone flags, and significant transform coefficients, an intra mode, a coefficient coding unit size, a transform unit size, a coding unit size, and whether to omit the transform.

8. The entropy decoding method as claimed in claim 5, wherein the determining the preset coefficient coding scheme comprises:
determining a first coefficient coding scheme for decoding a first zone among the plurality of zones if a first condition is satisfied, in which the value of the zone flag of the first zone is set to the first value, or the value of the sub zone flag for one or less of the plurality of sub zones included in a second zone is set to the first value in a state where the value of the zone flag of the first zone is not set to the first value;

determining a second coefficient coding scheme for decoding the first zone if the first condition is not satisfied;

determining a third coefficient coding scheme for decoding the second zone if a second condition is satisfied, in which the value of the zone flag of the second zone among the plurality of zones is set to the first value; and determining the first coefficient coding scheme for decoding the second zone and determining the third coefficient coding scheme for decoding remaining zones among the plurality of zones if the second condition is not satisfied.

9. The entropy decoding method as claimed in claim 8, wherein at least one of the plurality of coefficient coding schemes includes last position information of the significant transform coefficient in the sub zone.

10. The entropy decoding method as claimed in claim 8, wherein at least one of the plurality of coefficient coding schemes includes information on a scanning zone of the significant transform coefficient in the sub zone.

11. The entropy decoding method as claimed in claim 10, wherein the scanning zone is a rectangular zone that is formed by coordinates having a pair of an x-coordinate of a maximum point where the significant transform coefficient is positioned in a right direction and a y-coordinate of a maximum point where the significant transform coefficient is positioned in a downward direction based on a left upper end point of the sub zone and coordinates of the left upper end point.

12. The entropy decoding method as claimed in claim 10, wherein at least one of the plurality of coefficient coding schemes includes E1 flag information indicating that all significant transform coefficients in the sub zone are 1.

13. The entropy decoding method as claimed in claim 5, wherein information on a size of the zones includes at least one of a slice header, a PPS, and an SPS.

14. The entropy decoding method as claimed in claim 5, wherein whether to divide the zone and the sub zone is determined according to luminance and chrominance, and in the case of the luminance, the zone and the sub zone are divided, whereas in the case of the chrominance, the zone and the sub zone are not divided.

15. The entropy decoding method as claimed in claim 5, wherein the determining the preset coefficient coding scheme determines the preset coefficient coding scheme based on the zone flag and the sub zone flag in a case of luminance, and determines an HEVC coefficient coding scheme in a case of chrominance.

* * * * *